(12) United States Patent
Takashi et al.

(10) Patent No.: US 8,117,518 B2
(45) Date of Patent: Feb. 14, 2012

(54) SIGNAL PROCESSING APPARATUS AND A DATA RECORDING AND REPRODUCING APPARATUS INCLUDING LOCAL MEMORY PROCESSOR

(75) Inventors: Terumi Takashi, Chigasaki (JP); Seiichi Mita, Kanagawa-ken (JP); Atsushi Saito, Chigasaki (JP)

(73) Assignee: Hitachi Global Storage Technologies Japan, Ltd., Kanegawa (JP)

( * ) Notice: Subject to any disclaimer, the term of this patent is extended or adjusted under 35 U.S.C. 154(b) by 1088 days.

(21) Appl. No.: 12/003,270

(22) Filed: Dec. 21, 2007

(65) Prior Publication Data

US 2008/0178060 A1      Jul. 24, 2008

Related U.S. Application Data

(63) Continuation of application No. 11/272,837, filed on Nov. 15, 2005, now Pat. No. 7,334,165, which is a continuation of application No. 10/206,104, filed on Jul. 29, 2002, now Pat. No. 7,028,214, which is a continuation of application No. 09/314,955, filed on May 20, 1999, now Pat. No. 6,519,715.

(30) Foreign Application Priority Data

May 22, 1998    (JP) .................................. 10-140847

(51) Int. Cl.
*G06F 11/00*       (2006.01)

(52) U.S. Cl. ........................................ 714/763
(58) Field of Classification Search ................... 714/763
See application file for complete search history.

(56) References Cited

U.S. PATENT DOCUMENTS

| | | | |
|---|---|---|---|
| 4,799,112 A | 1/1989 | Bremmer et al. | 360/31 |
| 4,819,090 A * | 4/1989 | Hikawa | 360/32 |
| 5,068,754 A | 11/1991 | Garde | 360/45 |
| 5,262,907 A | 11/1993 | Duffy et al. | 360/77.05 |
| 5,438,462 A | 8/1995 | Copolillo | 360/53 |
| 5,491,698 A | 2/1996 | Patel et al. | |

(Continued)

FOREIGN PATENT DOCUMENTS

JP           1143447          6/1989

(Continued)

OTHER PUBLICATIONS

Y. Okamoto, et al "A Study of Performance Evaluation System for PRML System", The Institute of Electronics, Information and Communication Engineers, Technical Report of IEICE, Dec. 1997, pp. 9-15.

(Continued)

*Primary Examiner* — Bryce Bonzo
(74) *Attorney, Agent, or Firm* — Brundidge & Stanger, P.C.

(57) ABSTRACT

In a data recovery processing, the conventional overhead, primarily, latency due to a rotational recording media is removed. Secondary, in a signal processing or in a recording and reproducing apparatus, reliability of data reproduction is improved by repeatedly processing data. These processing are achieved that input signal, i.e., raw analog signal read from the recording media is digitized to be stored in a secondary storage such as a memory or a FIFO memory. The apparatus includes a signal processing circuit to repeatedly process the stored digital signal in the secondary storage. When detecting data, operation of the circuit is efficiently controlled by a change over detector parameters, in which characteristics for the detecting performance. Resultantly, data recovery processing speed is increased and reliability of data reproduced is improved.

4 Claims, 34 Drawing Sheets

U.S. PATENT DOCUMENTS

| | | | | |
|---|---|---|---|---|
| 5,606,468 | A | 2/1997 | Kodama et al. | 360/75 |
| 5,721,816 | A | 2/1998 | Kusbel et al. | 714/15 |
| 5,760,984 | A | 6/1998 | Spurbeck et al. | |
| 5,771,127 | A | 6/1998 | Reed et al. | |
| 5,802,118 | A | 9/1998 | Bliss et al. | |
| 5,838,512 | A | 11/1998 | Okazaki | 360/51 |
| 5,852,524 | A * | 12/1998 | Glover et al. | 360/51 |
| 5,926,490 | A * | 7/1999 | Reed et al. | 714/787 |
| 5,954,837 | A | 9/1999 | Kim | 714/795 |
| 6,009,549 | A * | 12/1999 | Bliss et al. | 714/769 |
| 6,023,386 | A * | 2/2000 | Reed et al. | 360/51 |
| 6,037,886 | A | 3/2000 | Staszewski et al. | 341/123 |
| 6,046,873 | A | 4/2000 | Hori et al. | 360/53 |
| 6,052,248 | A * | 4/2000 | Reed et al. | 360/53 |
| 6,108,152 | A | 8/2000 | Du et al. | |
| 6,178,054 | B1 | 1/2001 | Wakefield | 360/31 |
| 6,185,173 | B1 * | 2/2001 | Livingston et al. | 369/59.21 |
| 6,229,660 | B1 | 5/2001 | Chung | 60/51 |
| 6,246,723 | B1 * | 6/2001 | Bliss et al. | 375/265 |
| 6,249,394 | B1 | 6/2001 | Li et al. | 360/31 |
| 6,266,203 | B1 | 7/2001 | Street et al. | 360/69 |
| 6,310,739 | B1 | 10/2001 | McEwen et al. | 360/25 |
| 6,320,710 | B1 | 11/2001 | Ohnishi | 360/22 |
| 6,337,777 | B1 | 1/2002 | Matsubara et al. | 360/48 |
| 6,480,559 | B1 * | 11/2002 | Dabak | 375/368 |
| 6,513,141 | B1 * | 1/2003 | Livingston | 714/792 |
| 6,519,715 | B1 | 2/2003 | Takashi et al. | |
| 6,532,126 | B1 | 3/2003 | Nguyen et al. | 360/63 |
| 7,028,214 | B2 | 4/2006 | Takashi et al. | |
| 7,929,238 | B1 * | 4/2011 | Vasquez | 360/51 |
| 2002/0166094 | A1 * | 11/2002 | Blaum et al. | 714/777 |

FOREIGN PATENT DOCUMENTS

| | | |
|---|---|---|
| JP | 22719 | 1/1990 |
| JP | 5225693 | 9/1993 |
| JP | 05250816 | 9/1993 |
| JP | 06005009 | 1/1994 |
| JP | 06139717 | 5/1994 |
| JP | 06215307 | 8/1994 |
| JP | 6267238 | 9/1994 |
| JP | 7201135 | 8/1995 |
| JP | 8022675 | 1/1996 |
| JP | 08022675 | 1/1996 |
| JP | 832936 | 2/1996 |
| JP | 8116275 | 5/1996 |
| JP | 8153366 | 6/1996 |
| JP | 9231506 | 9/1997 |
| JP | 09330569 | 12/1997 |
| JP | 9330569 | 12/1997 |
| JP | 1069727 | 3/1998 |
| WO | 9814936 | 4/1998 |

OTHER PUBLICATIONS

S. Mita, et al "A PRML and EPRML Spliced Operation Scheme Designed to Reduce Power Dissipation of Read Channel Chips" IEEE Transactions on Magnetics, vol. 34, No. 1, Jan. 1994, pp. 153-159.

R. Wood, et al, "Viterbi Detection of Class IV Partial Response on a Magnetic Recording Channel", IEEE Transactions on Communications, vol. Com-34 No. 5, May 1986, pp. 454-461.

* cited by examiner

I/O CHARACTERISTIC OF As COMPENSATION

EMBODIMENT OF As COMPENSATING CIRCUIT

FIG. 24

```
          initialize(){              WRA ADDRESS A : wr_a
              wr_a = 0 ;             RDA ADDRESS A : rd_a
step1         rd_a =−N_offset ;      WRB ADDRESS B : wr_b
              wr_b = 0 ;             RDB ADDRESS B : rd_b
              rd_b =−N_offset ;
          }
          execute(fixed_start, fixed_nco){
step2     *wr_a->raw_data−eq_out ;
step3     agc_in =*rd_a ;

if(fixed_start){
              rd_a−= N_delay ;
              wr_b−= N_delay ;
              for(i=rd_a; i<rd_a+N_area ; i++){
step4             *(i->raw_data)=0;
                  *(i->nco_internal)=fixed_nco;
              }
          } step5     *wr_b = itr(rd_a);

wr_b++;
          rd_b++;
step6
          rd_a++;
          wr_a++;
          }
          itr(*pointer){
              filter_in = phase_error(pointer->raw_data);
              nco_in = filter(filter_in, pointer->filter_internal);
step7         phase_offset = nco(nco_in, pointer->nco_internal);
              itr = interpolater(phase_offset);
          }
```

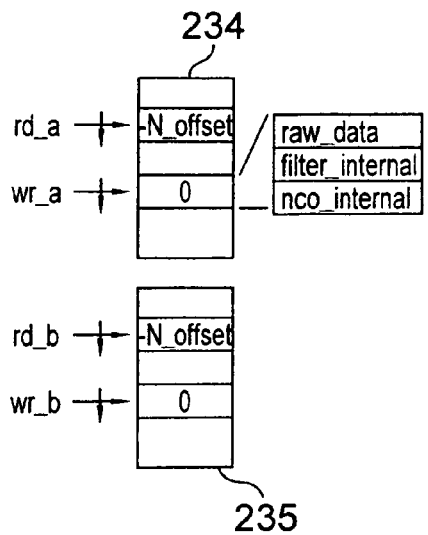

SIGNAL PROCESSING APPARATUS AND A DATA RECORDING AND REPRODUCING APPARATUS INCLUDING LOCAL MEMORY PROCESSOR

The present application is a continuation of application Ser. No. 11/272,837, filed Nov. 15, 2005; now U.S. Pat. No. 7,334,165 which is a continuation of application Ser. No. 10/206,104, filed Jul. 29, 2002, now U.S. Pat. No. 7,028,214; which is a continuation of application Ser. No. 09/314,955, filed May 20, 1999, now U.S. Pat. No. 6,519,715, the contents of which are incorporated herein by reference.

BACKGROUND OF THE INVENTION

The present invention relates to a signal processing method for a magnetic disk drive, an optical disk drive, and the like, and in particular, to a signal processing method capable of improving data reliability in data recovery.

DESCRIPTION OF THE RELATED ART

Signal processing apparatuses such as a disk drive recently utilize a partial response maximum likelihood (PRML) data detecting method, which makes it possible to obtain a desired data error rate with a low signal-to-noise ration. A representative PRML data detecting method for a magnetic disk drive has been described in pages 454 to 461 of "Viterbi Detection of Class IV Partial Response on a Magnetic Recording Channel" written by Roger W. Wood in "IEEE Transactions on Communications, Vol. Com-34, No. 5, May 1986. Additionally, as described in JP-A-7-201135 and JP-A-8-116275, an Extended PRML (EPRML) data detecting method has been adopted to reproduce signals with a lower signal-to-noise ratio. To sample signal waveforms in the PRML signal detection method, a phase locked loop circuit is used as described in JP-A-1-143447 and JP-A-2-2719. Recently, an interpolated timing recovery (ITR) circuit as described in JP-A-9-231506 has been proposed to produce synchronized target sample data from asynchronously sampled data.

FIG. 38 shows an example of structure of a general magnetic disk drive employing the PRML data detection method. A magnetic recording media 54 is a circular rotating magnetic recording media and is used to record data from host processor. In the media 54, data track information and sampled servo information are located in order to achieve appropriate date recording and reproducing processing, as shown in FIG. 39. Data track information stores data from host processor. Data recording and reproducing processor is carried out for each block called "sector" on tracks concentrically formed on the media 54. Sampled Servo information, which follow the head 53 to appropriate track, is recorded on the media 54 in a fixed interval. To follow the head 53 on rotating track, a servo control circuit 52 positions head 53 in accordance with servo-information. The other constituent components of FIG. 38 are disposed for the recording/reproducing of data from host processor and operate as following.

Recording process is started by a write instruction from host processor. The instruction is received by a microprocessor 55 through a controller 51. Microprocessor 55 issues write control command to controller 51 and servo controller 52. Controller 51 temporarily-stores record data following the write instruction in a random access memory (RAM) 56. Servo controller 52 moves head 53 to a predetermined track, which is assigned in the write instruction. After head 53 is completely positioned to the track, the data temporarily recorded in RAM 56 is sent to a recorder circuit 58 together with a sync signal necessary for reproduction of the data and an error correction code (ECC) generated by an ECC generating and correcting circuit 57. Recorder circuit 58 modulates the write data stream based on a PRML data detection method. Resultantly, the write data stream is written via a read/write (RW) amplifier 59 and head 53 in a sector of the predetermined track.

On the other hand, reproducing of data from a magnetic disk drive is commenced by a read instruction of host controller. On receiving the read instruction, microprocessor 55 issues a read control command to servo controller 52 and controller 51. Servo controller 52 moves head 53 to a track in which specified data is recorded. When head 53 is positioned to the specified track, controller 51 instructs a reproducer circuit 601 to initiate reading data. A read data stream of the target sector recorded on media 54 is transmitted as reproducing signals via head 53 and RW amplifier 59 to reproducer circuit 60. In accordance with the sync signal added to the data in the recording thereof, reproducer circuit 60 produces read data synchronized with the reproducing signals. Using sampled signals synchronized with the reproducing signals, a PRML data detection circuit demodulates read data. The read data is temporarily stored in RAM 56. ECC circuit 57 checks and corrects errors of the read data. When the data has no errors or correctable errors by using ECC circuit 57, the data is transferred as reproduced data to the host processor. When ECC circuit 57 cannot correct all errors, microprocessor 55 retries read operation while using variable control parameters until the data can be correctly reproduced. Finally, the trusted data in RAM 56 is transferred via controller 51 to the host processor. Otherwise, a reproduction error is notified thereto. In addition to the recording and reproducing of data, the system conducts a dropout detecting operation to detect a position and length of dropout on media. And also, the system conducts optimization of circuit parameters to change characteristics of recorder and reproducer circuits 58 and 60.

Magnetic recording and reproducing apparatuses of the conventional technology achieves data recording and reproducing operations in the configuration described above.

In the recording and reproducing operations, when read data has correctable errors by using ECC circuit 57, the corrected data is immediately transferred to the host processor. However read data has uncorrectable errors exceeded correction capability of the ECC circuit 57, magnetic recording and reproducing apparatuses retries read operation from the sector on media 54. Therefore, it needs a wait time to start reread target sector operation, called read latency. This leads to a problem of disadvantageous elongation in the data access time.

Moreover, a partial missing of record information due to, for example, dropout of a magnetic film of media 54 may cause a miss-lock of phase locked loop circuit. In such a situation, the retry of data reproduction usually fails and hence additional latency is required. Resultantly, the data access time is conspicuously elongated.

In addition, optimization of circuit parameters of the signal processing circuit and surface check of a disk are repeatedly carried out in accordance with reproducing signals from the disk while changing circuit parameters. Resultantly, time for optimization and testing of the magnetic recording and reproducing apparatuses is increased.

SUMMARY OF THE INVENTION

It is therefore a first object of the present invention to provide a signal processing apparatus capable of reducing the latency due to data errors.

A second object of the present invention is to provide a signal processing apparatus capable of reducing a data burst error related to an erroneous operation of the phase locked loop circuit.

A third object of the present invention is to provide a signal processing apparatus capable of minimizing the time required for the optimization of circuit constants and/or for the testing of the magnetic recording and reproducing apparatus.

In accordance with the present invention, the first object can be achieved by providing a storage method for storing reproduction signals. The stored reproduction signals are conducted by data reproduction using different control parameters.

In accordance with the storage method, the reproducing operation can be repeatedly conducted with different control parameters without latency.

Additionally, the first object can be achieved by providing a storage unit for storing signals obtained by reproducing an identical sector several times, and an average unit for averaging the reproduced signals. Since the storage and the average unit improve the signal-to-noise ratio, reliability of the second and subsequent data reproducing operations is increased.

The second object of the present invention can be achieved by providing a storage device to store reproduction signals, and a sampling data generator to reproduce sampling phase locked data from the reproduction signal. The sampling data generator with storage device suppresses erroneous operations of the phase locked loop circuit after a data dropout.

The third object of the present invention can be achieved by providing a storage device to store reproduction signals such that the optimization of circuit parameters or the tests of the magnetic recording and reproducing apparatus is repeatedly accomplished using the stored signals in the storage.

BRIEF DESCRIPTION OF THE DRAWINGS

The objects and features of the present invention will become more apparent from the consideration of the following detailed description taken in conjunction with the accompanying drawings in which:

FIG. 24 is a diagram for explaining an example of a control procedure of the RAM in accordance with the present invention;

DETAILED DESCRIPTION OF THE EMBODIMENTS

Figure 1:
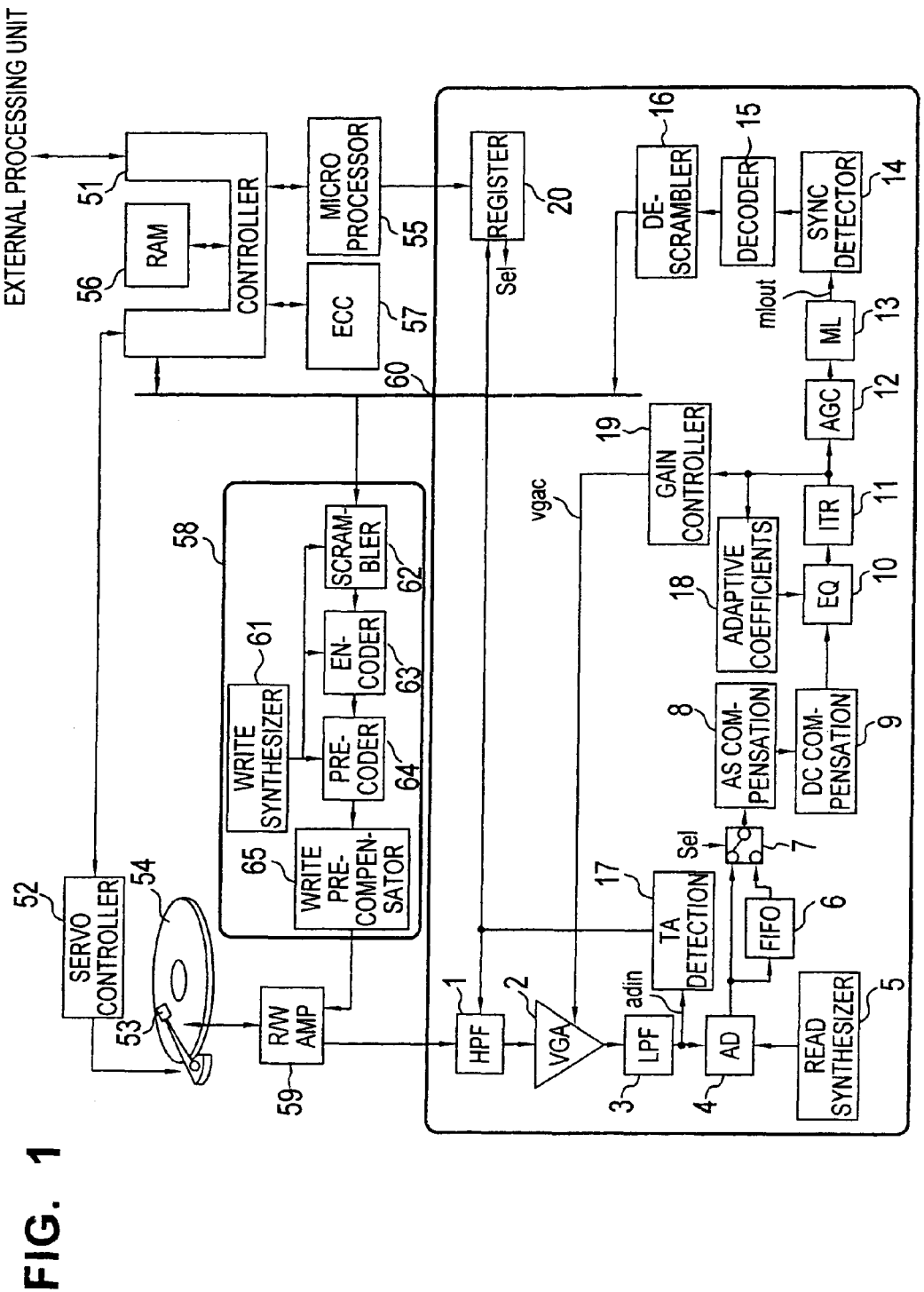
FIG. 1 is a block diagram showing an example of constitution of a magnetic recording and reproducing apparatus using a reproducing circuit in accordance with the present invention.

Referring now to the drawings, description will be given of an embodiment in accordance with the present invention.

FIG. 1 shows a magnetic recording and reproducing apparatus using a reproducing circuit to achieve the first object of the present invention. The embodiment is configured basically in the same fashion as for the conventional example except a block of a reproducer circuit 60. A recorder circuit 58 includes a write synthesizer 61 to determine a data recording frequency, a scrambler 62 to randomize a sequence of record data, an encoder 63 to modulate data, a pre-coder 64, and a write pre-compensation circuit 65 to compensate nonlinear distortion inherent to the magnetic recording. The reproducer circuit 60 primarily includes an analog block to process analog signals from an RW amplifier 59 and a digital block to process digital signals obtained by sampling the analog signals. The analog block includes a high-pass filter (HPF) 1 to interrupt signals having a low frequency, a variable gain amplifier (VGA) 2 to keep amplitude of input signals within a fixed range, a low-pass filter (LPF) 3 to eliminate noises of a high frequency, analog to digital (AD) converter 4 to convert analog signals into digital signals, a read synthesizer 5 to determine a sampling frequency, and a thermal asperity (TA) detector circuit 17 to detect a variation of baseline in a signal waveform due to contact of a head-53 with a magnetic recording media 54. The digital block includes an FIFO circuit 6 to store the digital signals sampled by AD converter 4, a selector circuit 7 to select digital signals, an Asymmetrical (As) waveform compensating circuit 8 to digitally compensate waveform asymmetry, a DC compensating circuit 9 to digitally compensate variation in the baseline due to thermal asperity, an equalizer circuit 10 to equalize waveforms, an adaptive coefficient learning circuit 18 to optimize characteristics of equalizer 10, an interpolated timing recovery (ITR) circuit 11 to generate digital signals synchronized with record timing in accordance with asynchronously sampled digital signals, a gain control circuit 19 to adjust amplitude of digital signals within a fixed range, an amplitude gain controller (AGC) circuit 12, a maximum likelihood (ML) detector circuit 13 to detect data in an ML detecting method, a sync detector circuit 14 to synchronize byte boundary, a decoder 15 to demodulate data, a de-scrambler 16 to restore data randomized by scrambler 62 into a sequence of original data, and a register 20 to control an operation mode of reproducer circuit 60.

Operation of the magnetic recording and reproducing apparatus will be described. First, description will be given in detail of data recording operation. This operation is commenced by a write instruction from an external host processor. The instruction is fed via controller 51 to microprocessor 55, which then issues a write control command to controller 51 and servo control circuit 52. Controller 51 temporarily stores user data, which following the write instruction from the host processor, in a random access memory (RAM) 56. Servo control circuit 52 receives the write control command and moves head 53 to a track specified on media 54. After head 53 is moved, controller 51 searches servo information for a recording position of an associated sector and asserts a write gate to recorder circuit 58. Controller 51 delivers a write data stream to recorder circuit 58, that is constructed with PLO data (PLO) for bit synchronization, sync data (SYNC) for byte synchronization, user data (DATA) stored in RAM 56, and an error correction code (ECC) generated by ECC circuit 57. Recorder circuit 58 processes a write data stream in accordance with clock signals from write synthesizer 61. User data following the sync data are randomly scrambled using scrambler 62. The write data stream with data randomizer is modulated by encoder 63, for example, that is conducted a block modulation from 8-bit data into 9-bit-data. After the block modulation, the entire write data stream is modulated by pre-coder 64, for example, that is conducted a bit modulation of 1/(1+D 2). Symbol D 2 indicate delay operator that is a bit information previously two clock samples. Operator+denotes an exclusive logical sum operation. Write pre-compensation circuit 65 compensates the nonlinear distortion characteristic due to the magnetic recording. The circuit shifts a current bit position decided by combination of a plurality of previous recorded bits. A sequence of write data stream thus obtained is recorded via RW amplifier 59 and head 53 on the target sector on media 54.

Subsequently, description will be given of operation to reproduce data. The operation of the magnetic recording and reproducing apparatus is initiated by a read instruction from a host processor. Microprocessor 55 receives the read instruction and then issues a read control command to servo control circuit 52 and controller 51. The servo control circuit 52 moves head 53 to a specified track. When head 53 is moved, controller 51 searches servo information for a reproducing position of a target sector and asserts a read gate to reproducer circuit 60. Record information on media 54 is sent to reproducer circuit 60 as reproducing signal via head 53 and RW amplifier 59. HPF 1 and LPF 3 eliminate noise beyond reproducing sign bandwidths respectively. VGA 2, gain controller 19, and AGC circuit 12 set amplitude of input value for the ML detector circuit 13. When TA detector 17 detects thermal asperity, microprocessor 55 recognizes occurrence of thermal asperity via register 20 and increases a cut-off frequency of HPF 1 to minimize the baseline variation due to thermal asperity. AD circuit 4 samples the analog signal of which waveforms have been processed as above in accordance with sampling clock signal from read synthesizer 5, and converts the analog signals to produce digital sampled value. The sampling clock signal of read synthesizer 5 is not necessarily to be synchronized with respect to a frequency and a phase of reproduced signals. Namely, ITR circuit 11 synchronizes the frequency and the phase. The digital sampled value by AD circuit 4 is stored in the FIFO circuit 6 and is outputted via selector 7 to As compensation circuit 8. Ordinarily, selector 7 selects an output from AD circuit 4 in response to sel signal (=0) of register 20 set by microprocessor 55. When microprocessor 55 determines that the data reproduction is again required and sets sel signal (−1) of register 20, Stored digital value in FIFO circuit 6 is connected to As compensation circuit 8. The output value from selector 7 is decided into a bit data through As compensation circuit 8, DC compensation circuit 9, equalizer 10, ITR circuit 11, AGC circuit 12, and ML detector circuit 13, which have parameters—to characterize each component according to sel signal. An example of configurations of these components will be described later. Sync detector 14 detects byte boundary of the bit data stream, decoder 15 demodulates synchronized byte boundary data by using conversion table reversed to the conversion of encoder 63, and de-scrambler 16 converts demodulated data into original user data. Obtained user data is temporarily stored in RAM 56 via controller 51. ECC circuit 57 detects and corrects errors of the stored user data. If no error or correctable errors are detected in user data by ECC circuit 57, the data string is transferred as reproduced data via controller 51 to the host processor. On the other hand, if ECC circuit 57 cannot correct the errors, microprocessor 55 sets sel signal (=1). By using the output value from FIFO 6, reproducing operation from media 54 is not necessary. Microprocessor 55 repeatedly conducts the data reproduction by reproducer circuit 60 until the data is appropriately reproduced by each reproducing component. Output value from FIFO 6 is reproduced by using different characteristics of As compensation circuit 8, DC compensation circuit 9, equalizer 10, ITR circuit 11, AGC circuit 12, ML detector circuit 13, and sync detector 14. If user data is correctly obtained, the reproduced data in RAM 56 is transferred via controller 51 to the host processor. Otherwise, the data reproducing operation from media 53 is repeatedly conducted again by the magnetic recording and reproducing apparatus. If user data cannot be appropriately reproduced as a result of the retry, a reproduction error is notified to the host processor.

The recording and reproducing apparatus conducts the recording and reproducing operations as above.

Description will now be given of reproducing components with variable characteristics, there are As compensation circuit-8, DC-compensation-circuit 9, equalizer 10, ITR circuit 11, AGC circuit 12, and ML detector circuit 13. In addition, description will be given of other detection method for retry operation using data value in FIFO 6.

Figure 6A:
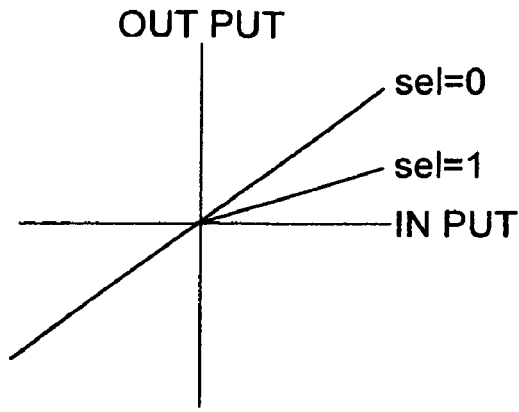
FIGS. 6A and 6B are diagrams for explaining an embodiment of a compensating circuit for asymmetrical waveforms in accordance with the present invention.
Figure 6B:
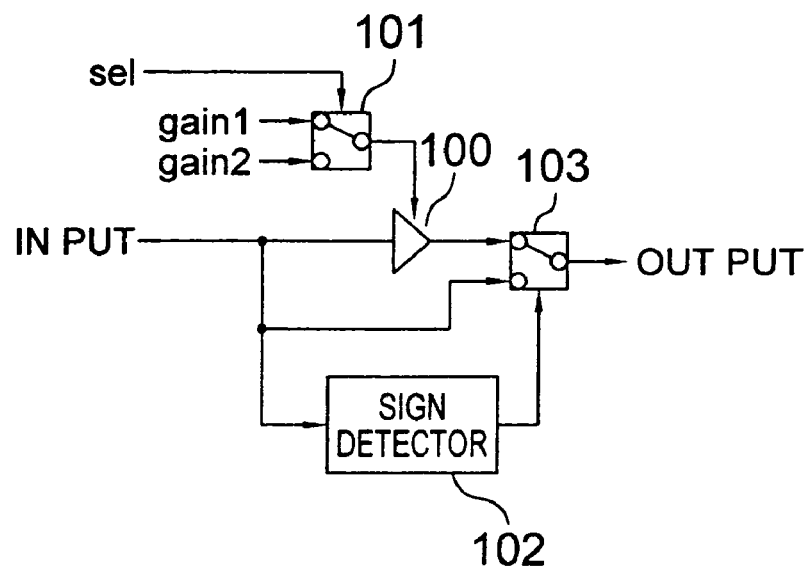

FIGS. 6A and 6B show an embodiment of As compensation circuit 8 in which FIG. 6A is an input/output characteristic, i.e., output signal amplitude versus input signal amplitude of As compensation circuit 8. As shown in FIG. 6A, a direct line is obtained with sel signal set to "0" and a broken line is attained with sel signal set to "1". An embodiment of As compensation circuit 8 having such a characteristic is shown in FIG. 6B, there are including a multiplier 100, selector circuits 101 and 103, and a sign detector 102. Sign detector 102 detects a sign of an input signal to generate selection signal for selector 103. In this example, selector 103 outputs a value from multiplier 100 when the input value is positive. The selector 103 outputs an input value itself when the input value—is negative. Selector-101 determines a coefficient of multiplier 100. In an ordinary state, i.e., when sel signal is "0", gain 1 is selected. Resultantly, gain 1 (=1.0) is used as a multiplier of multiplier 100. On the other hand, when sel signal is "1", gain 2 is selected and gain 2 (=0.5) is set as the multiplier of multiplier 100. Therefore, the input/output characteristic of As compensation circuit 8 is represented by a direct line for sel signal=0 and by a broken line (with multiplier=0.5) for sel signal=1 Thanks to the configuration above, As compensation circuit 3 has a variable parameter for retry operation from the FIFO 6.

Figure 7:
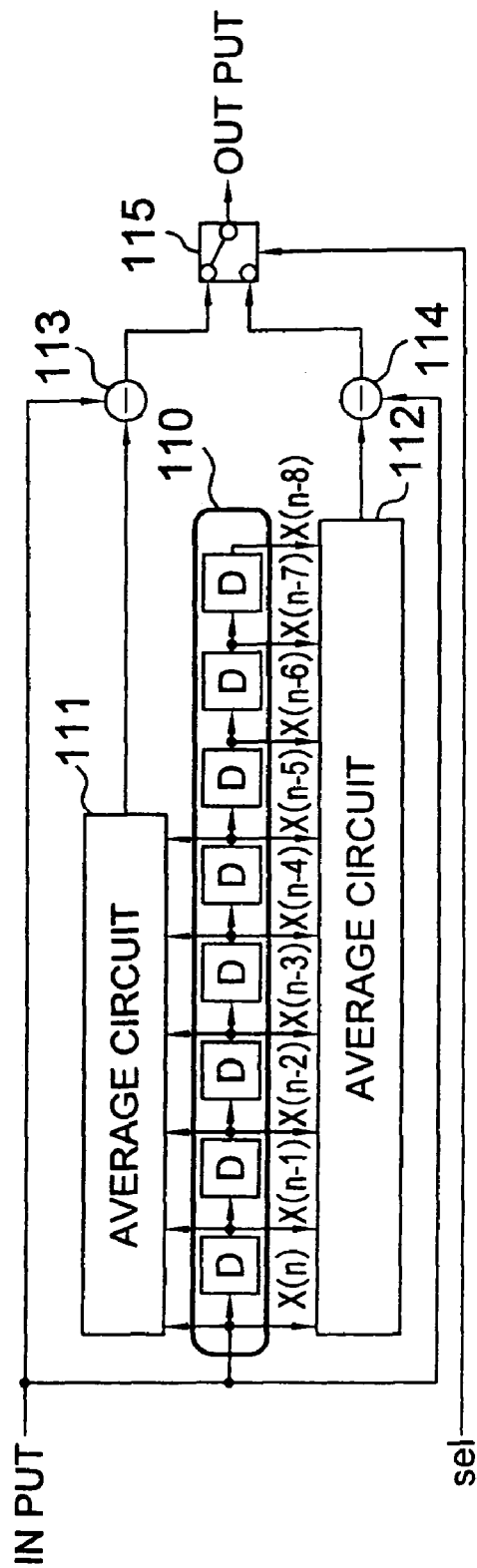
FIG. 7 is a circuit diagram for explaining an embodiment of a DC compensating circuit in accordance with the present invention.

FIG. 7 shows an embodiment of DC compensation circuit 9 which includes a delay circuit 110, average circuits 111 and 112, subtractors 113 and 114, and a selector circuit 115. In the delay circuit 110, input data is delayed for each sampling clock signal. When input data denotes x(n) at time n, each tap of the delay circuit 110 outputs x(n), x(n−1), . . . , x(n−8) respectively as shown in FIG. 7. Each average-circuit 111 and 112 calculate an average of the input data. Average circuit 111 outputs $y1(n)$ expressed as follows. $y1(n)=\Sigma\{x(k)\}/6$ where k is numerical value n to n−5 (1).

Average circuit 112 output $y2(n)$ expressed as follows. $y2(n)=\Sigma\{x(k)\}/9$ where k is numerical value n to n−8 (2).

Average circuits 111 and 112 calculate in different average lengths, which has different frequency characteristics of low-pass filters. Specifically, a characteristic to extract signal of low or near DC frequency such as thermal asperity varies between there. Outputs from subtractors 113 and 114 are obtained by conducting subtraction between an input value of DC compensation circuit 9 and output values from average circuits 111 and 112, respectively. Consequently, DC compensation circuit 9 has mutually different thermal asperity elimination characteristics. Selector 115 selects one of the DC compensation circuits 113 and 114 having different frequency characteristics based on sel signal. As a result, DC compensation circuit 9 has a variable DC compensation characteristic.

Figure 8:
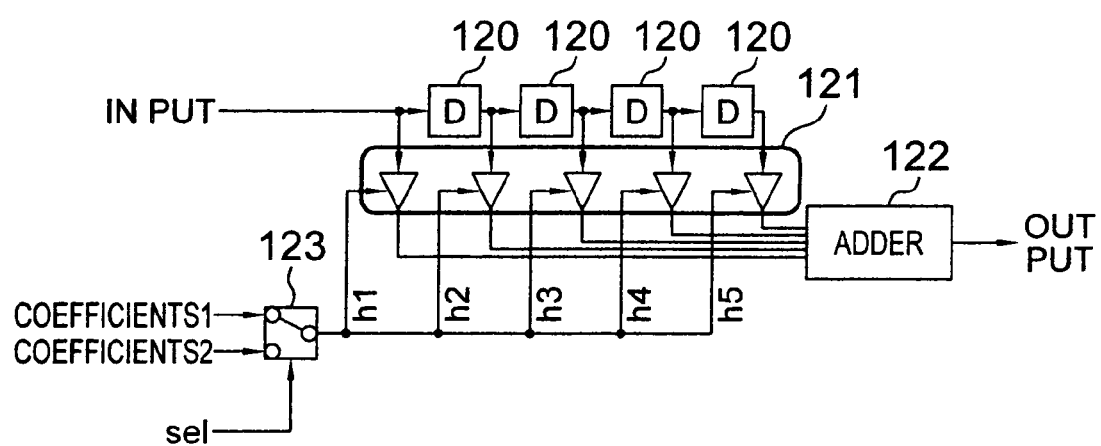
FIG. 8 is a circuit diagram for explaining an embodiment of an average circuit in accordance with the present invention.

FIG. 8 shows an embodiment of equalizer 10 having various equalization characteristics. Equalizer 10 includes a delay circuit 120, a multiplier 121, an adder 122, and a coefficient selector circuit 123. Delay circuit 120, multiplier 121, and adder 122 constructs a FIR filter. The FIR filter has a frequency characteristic in accordance with coefficients of multiplier 121. Selector 123 selects either one of coefficient groups 1 and 2 which are beforehand prepared by registers 20 or which are learned by adaptive coefficient circuit 18 in response to sel signal. Consequently, equalizer 10 has a different frequency characteristic in order to equalize input value.

Figure 9:
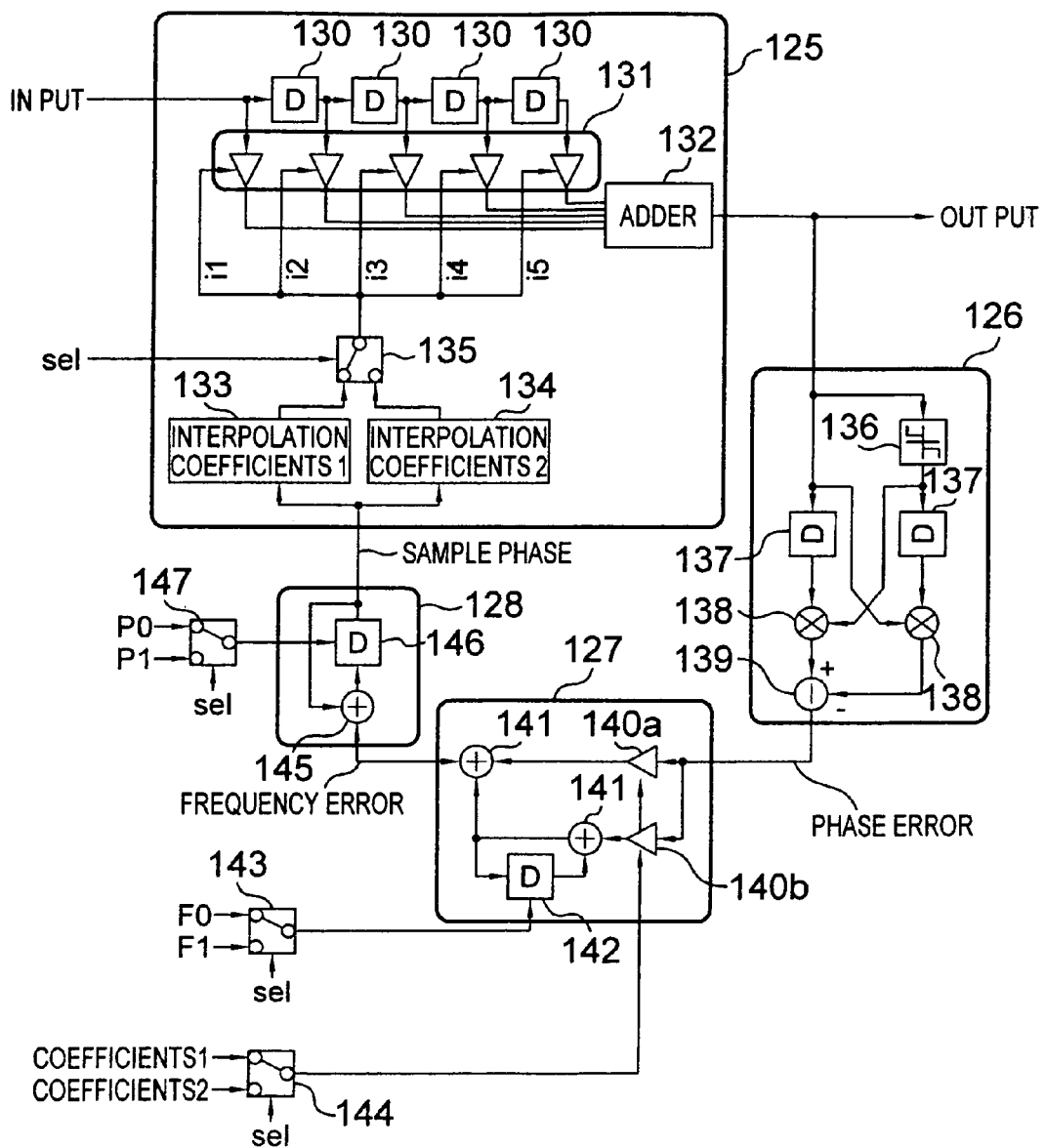
FIG. 9 is a block diagram for explaining an embodiment of an interpolated timing recovery (ITR) circuit in accordance with the present invention.

FIG. 9 shows an embodiment of ITR circuit 11 having a variable phase synchronization response. ITR circuit 11 includes an ITR filter 125, a phase error detector 126, a digital filter 127, and an integrator 128. Phase error detector 126 including data detector 136, a delay circuit 137, a multiplier 138, and a subtractor 139 detects phase error based on output value of ITR filter 125. Phase error from phase detector 126 is smoothed by digital filter 127 including multipliers 140a and 140b, an adder 141, and a delay circuit 142. Frequency error from digital filter 127 is integrated by integrator 128 including an adder 45 and a delay circuit 146. A value thus produced from integrator 128 determines the sample phase of ITR filter 125. ITR filter 125, which can be changed interpolation coefficients, is such kind of FIR-filter including a delay circuit 130, a multiplier 131, and an adder 132. Concretely, characteristic of ITR filter is decided interpolation phase value from integrator 128, and interpolation coefficient values. Interpolation phase value is calculated entire phase locked loop characteristic, which is made by digital filter 127 and integrator 128. Interpolation coefficient values of multiplier 131 are supplied from an interpolation coefficients 1 circuit 133 and an interpolation coefficients 2 circuit 134. Either one of the coefficients 1 and 2 is supplied through a changeover operation by a selector 135.

Description will now be given of operation of the ITR circuit 11 each having a characteristic variable in accordance with sel signal. The digital filter 127 has a frequency characteristic which is determined by multipliers of multipliers 140a and 140b and which can be hence changed in accordance with coefficient group 1 or 2 selected by a selector 144. Transfer function Hf(z) denotes for digital filter 127, and transfer function Ho(z) denotes for open loop of phase locked loop. These functions can be expressed as follows.

$$Hf(z)=A1*\{(1+A2/A1)-z\}/(1-z) \quad (3)$$

$$Ho(z)=K*Hf(z)/(1-z)$$

wherein, A1 is a coefficient of multiplier 140a, A2 indicates a coefficient of multiplier 140b, and k represents a loop gain. The frequency characteristics can be attained by substituting exp(−j 2.pi.f/fs) for z. In the expressions, f indicates a frequency, fs is a sampling frequency, j is an imaginary unit, and exp( ) represents a exponential function. Digital filter 127 configured as above has been known as a digital filter having a lag-lead characteristic. The filter 127 has a corner frequency determined by a coefficient ratio of A2/A1. When ratio A2/A1 has a high value, the corner frequency of filter 127 becomes higher and hence a zero-cross frequency of Ho(z) of ITR circuit 11 increases. When a zero-cross frequency of Ho(z) becomes higher, a characteristic to follow a phase locking response of ITR circuit 11 is increased. However, sampling jitter becomes greater with respect to noise components. Therefore, to achieve the phase locking in a stable state value in the re-read operation due to the lowering of the signal-to-noise ratio of reproduced signals, ratio A2/A1 is set to a smaller value.

Beforehand stored value in delay circuit 142 is data related to the frequency error between the sampling clock and the reproduced signal. ITR circuit 11 ordinarily completes frequency/phase locking or synchronization in a PLO region. However, if rotation speed of media 54 varies and hence the frequency error between the sampling clock and the reproduced signal becomes greater, the frequency synchronizing time cannot be sufficiently synchronized within the PLO region. Namely, data cannot be reproduced after this point of time. To overcome this difficulty, the frequency error is lowered to a range for the frequency synchronization by selecting F0 or F1 by selector 143, so that the frequency/phase synchronization is completed in the PLO region. Delay circuit 146 determines a sample phase to interpolate waveforms by ITR filter 125. In delay circuit 146, the frequency and phase synchronization is completed within the PLO region as described above. However, when PLO data fed to ITR circuit 11 has an insufficient length due to, for example, defect in reproduced waveforms, the data cannot be reproduced thereafter as above. To remove the disadvantage, initial-value P0 or P1 is so selected by selector 147 to change the initial phase. With an appropriate initial phase, ITR circuit 11 conducts a zero-phase start and hence the PLO region can be reduced. The phase locking is conducted for reproduced data in FIFO circuit 6 while the initial value of the sample phase is being changed. In consequence, the phase locking can be conducted in a stable state even within a short PLO region. Additionally, even without using the PLO region, the phase synchronization can be achieved by changing the initial values of P0 and P1 until a sync byte is detected in the sync area, which is possible because FIFO 6 contains sample data. This advantage cannot be obtained by the conventional method in the method above, the PLO region can be dispensed with and hence the area in which data is recorded can be expanded.

Selector circuit 135 changes interpolation coefficients of filter 125. When the frequency error between the sampling clock and the reproduced signal becomes greater, an estimation error due to data interpolation increases and the data demodulation performance is resultantly deteriorated. In this situation, it may also be possible to change the interpolation coefficients by sel signal to improve data interpolation precision.

In the embodiment above, clock control in association with lead and lag of sampling phase has not been considered. However, the method of control operation is substantially same as the conventional processing method and hence description thereof is skipped.

Figure 10:
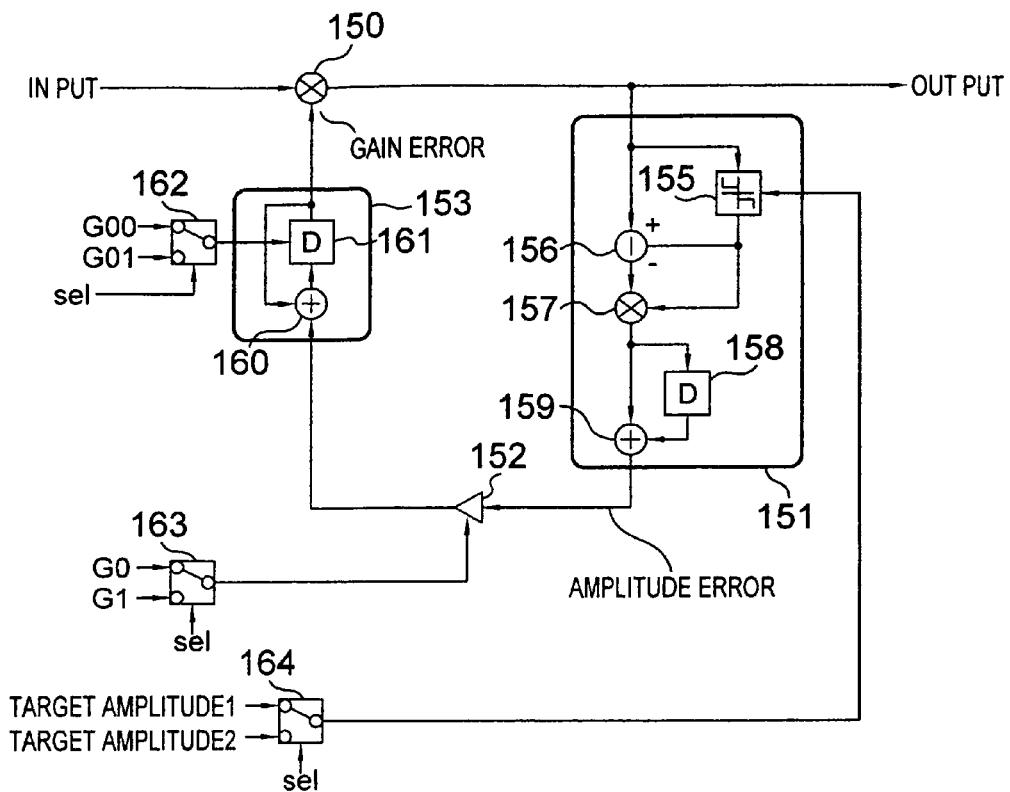
FIG. 10 is a block diagram for explaining an embodiment of an automatic gain control circuit in accordance with the present invention.

FIG. 10 shows an embodiment of AGC circuit 12 having a variable amplitude synchronization response. AGC circuit 12 includes a multiplier 150, an amplitude error detector 151, a multiplier 152, and an integrator 153. Detector 151 includes a detector 155, a subtractor 156, a multiplier 157, a delay circuit 158, and an adder 159, which are configured in the same manner as for associated detectors of the prior art. Detector 151 generates an amplitude error between an output value of AGC circuit 12 and a target value determined by a selector circuit 164. Multiplier 152 multiplies the amplitude error by a gain value determined by a selector 163. A result of multiplication delivers to integrator 153 including an adder 160 and a delay circuit 161. Integrator 153 integrates the amplitude error to produce an error gain, and multiplier 150 multiplies an input value thereto by the error gain to produce an output value from AGC circuit 12.

The sequence of operations is ordinarily completed in the PLO region and the gain error associated with the output value and the target amplitude is fed to delay 161. However, if the amplitude cannot be synchronized in the PLO region due to, for example, defect media that the user data cannot be reproduced thereafter. To overcome the difficulty, the initial gain error is changed by selection the initial value G00 and G01 by a selector 162. With an appropriate initial gain error, AGC circuit 12 carries out a zero-gain start and the PLO region can be minimized.

As for multiplier G0 or G1 selected by selector 163, when the amplitude drop becomes greater due to defect in reproduced waveforms, a data error may possibly occurs in data reproduced after the defect because of amplitude drop. To remove the disadvantage, in the data reproduction from FIFO 6, the multiplier supplied to multiplier 152 is reduced and hence the data reproduction is ensured after the defect. Selector 164 changes the target amplitude. When an amplitude drop occurs due to defect in reproduced waveforms, the data reproduction is conducted by lowering the target amplitude value below the ordinary target amplitude value. Therefore, in the data reproduction from FIFO 6, performance of data reproduction can be improved by selecting the target amplitude by selector 164.

Figure 11:
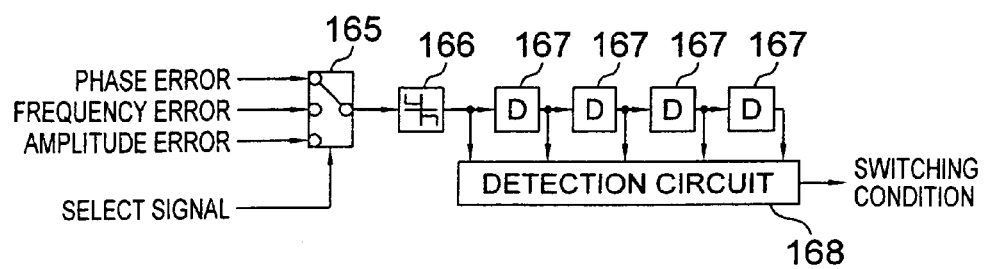
FIG. 11 is a circuit diagram for explaining an embodiment of a switching condition generator basis of an ITR circuit and a gain control circuit in accordance with the present invention.

FIG. 11 shows an embodiment of an operation to generate a switching condition using ITR circuit 11 and AGC circuit 12. Generator for switching condition includes a selector 165, a comparator 166, a delay circuit 167, and a detector circuit 168. Selector 165 selects the phase error value or the interpolation frequency-error value from ITR circuit 11 or the amplitude error value from AGC circuit 12 in response to a selecting signal. An error value selected by selector 165 delivers to comparator 166. Comparator 166 compares the selected error value with a predetermined threshold level. If the absolute of error value is equal to or more than the threshold level, comparator 166 outputs "1"; otherwise, comparator 166 produces "0". Delay circuit 167 stores an output from comparator 166 for each sample. Detector 168 determines a switching condition in accordance with the number of value "1" outputted from delay circuit 167. For example, if a phase locked loop has made a miss-lock due to such kind of dropout, phase error value from ITR circuit 11 exceeds the threshold level in successively. And another example, if the interpolation frequency error value is equal to or more than a threshold level, detector 168 detects occurrence of a frequency step with respect to frequency and similarly sets the switching condition to "1". In such conditions, detector 168 detects occurrence of a miss-operation, the switching condition set to "1". The switching condition is notified to microprocessor 55 via, for example, register 20.

Figure 12:
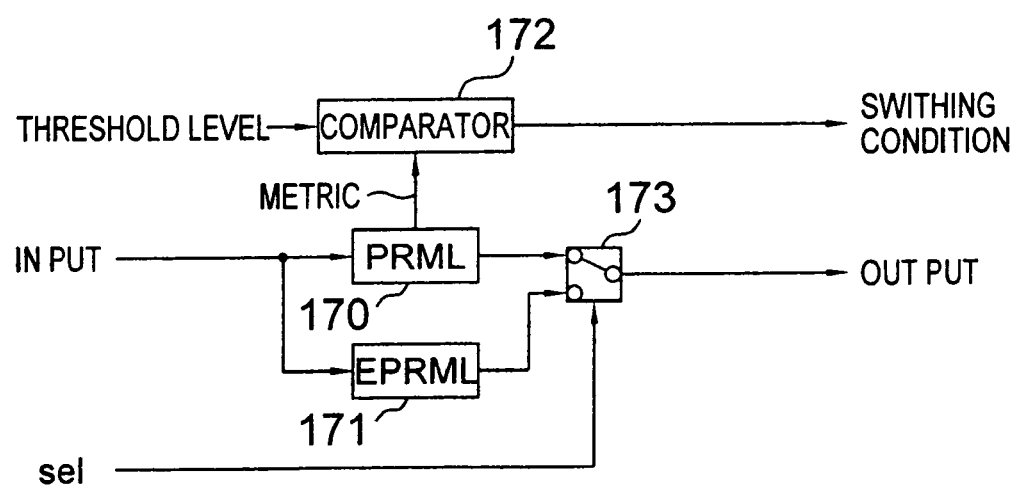
FIG. 12 is a circuit diagram for explaining an embodiment of a maximum likelihood (ML) data detector circuit in accordance with the present invention.

Referring now to FIG. 12, description will be given of an embodiment of ML detector circuit 13 having selective data detection method. ML detector circuit 13 includes a PRML detector circuit 170, an EPRML detector circuit 171, a comparator 172, and a selector 173. In an ordinary state, sel signal is "O" and selector 173 outputs a result of detection by PRML detector circuit 170. Comparator 172 compares a metric value indicating a detection margin of PRML detector circuit 170 with a known threshold level. If the metric value is less than the threshold level, comparator 172 asserts a switching condition and notifies the reduction of data detection margin to, for example, microprocessor 55. Resultantly, microprocessor 55 sets sel signal to "1" and reproduction data value from FIFO 6 is detected by EPRML circuit 171 to output a result of detector via selector 173. In the configuration, even when it is assumed that the data reproduction by PRML detector circuit 170 occurs miss-detection, the data detecting performance can be improved by using EPRML detector circuit 171, which has capable of detecting a low signal to noise ratio signals with a desired error rate.

Figure 13:
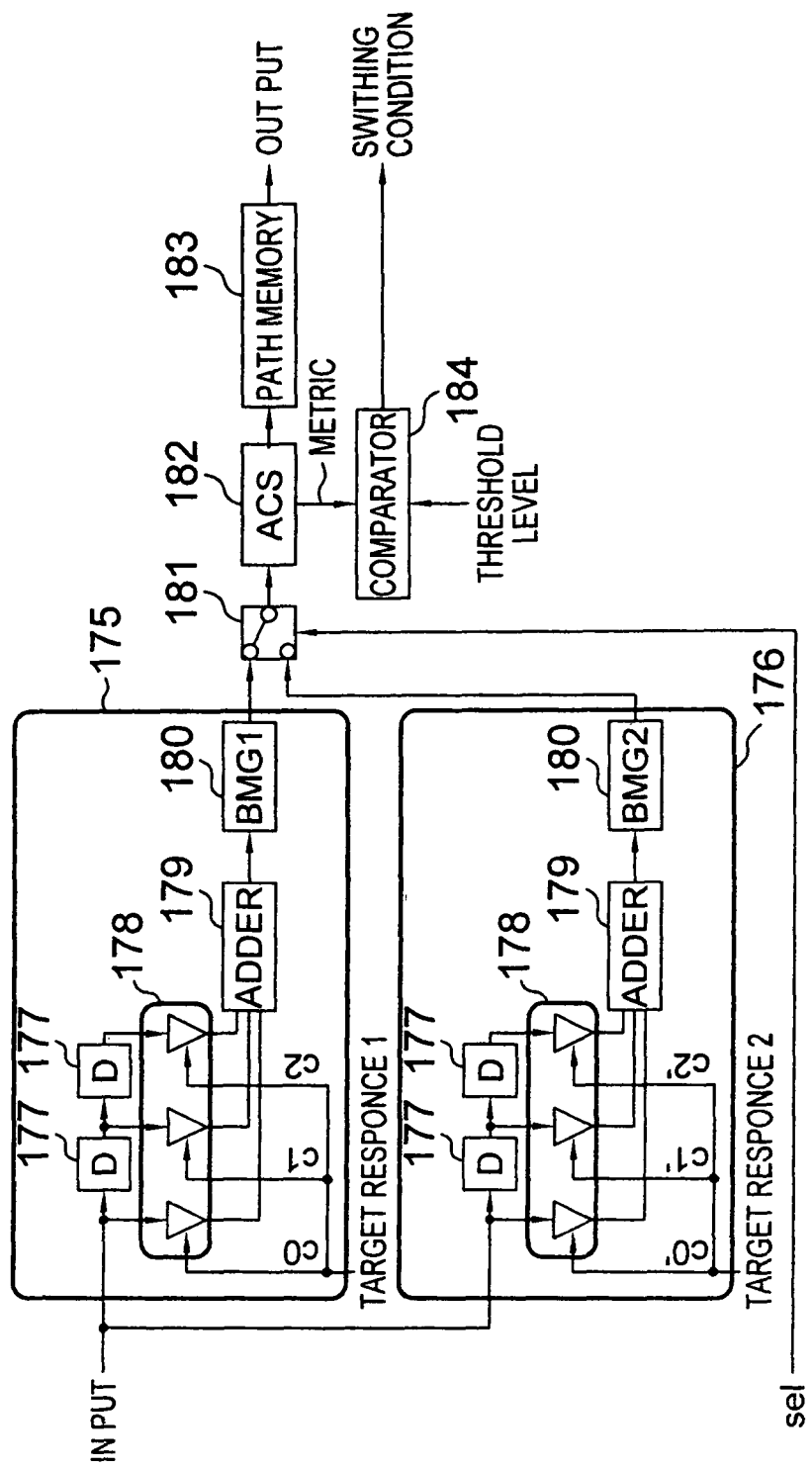
FIG. 13 is a block diagram showing another constitutional example of the ML data detector circuit corresponding to the circuit of FIG. 12.

Referring FIG. 13, description will be given of an alternative embodiment of ML detector circuit 13 having a complex variation of data detecting performance. ML detector circuit 13 includes branch metric generators 175 and 176, a selector 181, an ACS circuit 182, a path memory-183, and a comparator-184. Each of branch metric generators 175 and 176 includes a delay circuit 177, a multiplier 178, an adder 179, and a branch metric calculator 180. Branch metric generator circuit 175 has a characteristic of response 1, e.g., EEPRML (1,2,1). In contrast therewith, branch metric generator circuit 176 has a characteristic of response 2, e.g., Modified-EEPRML(2,2,1). Selector 181 selects one of the outputs from the branch metric generators having mutually different responses and sends the output to ACS circuit 182. ACS circuit 182 conducts addition, comparison, and selection for detecting paths in accordance with the branch metric and outputs selection information to path memory 183. Path memory 183 determines probability of the correct path in a time sequence to output a detecting result with a most probability. On the other hand, comparator 184 compares the metric value as margin for the path addition and comparison by ACS circuit 182 with a known threshold level. If the metric value is equal to or less than the threshold level, comparator 184 asserts a switching condition and notifies the reduction of data detection margin to, for example, microprocessor 55. Resultantly, as described above in conjunction with ML circuit, microprocessor 55 sets sel signal to "1" to accomplish the detection with reproduced data from FIFO 6. Selector 181 outputs the branch metric from branch metric generator 176 to ACS circuit-182. Thanks to the configuration above, there can be implemented a ML circuit having a variety of data detecting performance.

The embodiment conducts selection between different responses. However, even if the coefficients of branch metric generator circuit 176 are k times (k is a rational number) that of branch metric generator circuit 175, the ML circuit can be processed through similar above processing.

Figure 14:
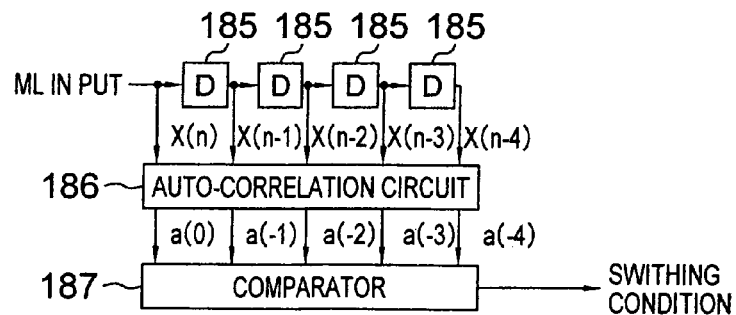
FIG. 14 is a block diagram showing another constitutional example of the ML data detector circuit corresponding to the circuit of FIG. 13.

Referring next to FIG. 14, description will be given of an alternative embodiment of the switching condition generator in the ML circuit. The generator circuit includes a delay circuit 185, an auto-correlation circuit 186, and a comparator 187. Delay 185 stores a value obtained by delaying an input value to ML detector circuit 13. When an input value at time n is denoted as x(n), input values to auto-correlation circuit 186 are input x(n) and outputs x(n−1), . . . , x(n−4) from delay circuit 185. Auto-correlation circuit 186 calculates an auto-correlation function of input values to ML detector circuit 13. The function is represented as follows.

$$a(-j)=\{\Sigma(x(n)*x(n-j))/x(n)*x(n)\}/N$$

$$n=0 \text{ to } N-1, j=0 \text{ to } 4 \quad (4)$$

The DC frequency component of input value assumes to be beforehand removed. The auto-correlation function represents correlation of reproduced waveform with noise. When this characteristic is greatly differs from a known-appropriate value, reproduction performance of ML detector circuit 13 is conspicuously deteriorated. To cope with this situation, a(j) attained from the auto-correlation function is compared with an associated value of a known auto-correlation function, which determines occurrence of changing the waveform characteristics. A result of determination is outputted as a switching condition to microprocessor 55. Using the configuration above, there can be implemented a switching condition generator circuit.

Figure 15:
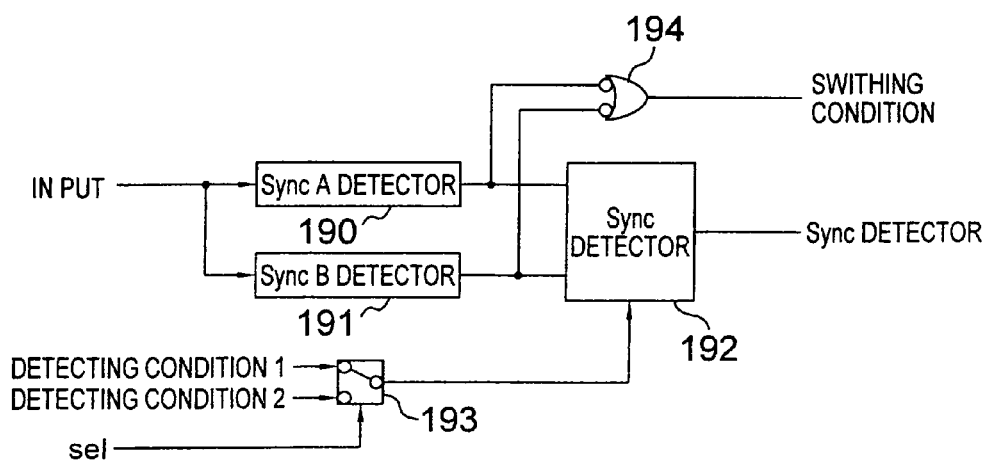
FIG. 15 is a circuit diagram for explaining an embodiment of a sync detector circuit in accordance with the present invention.
Figure 16:
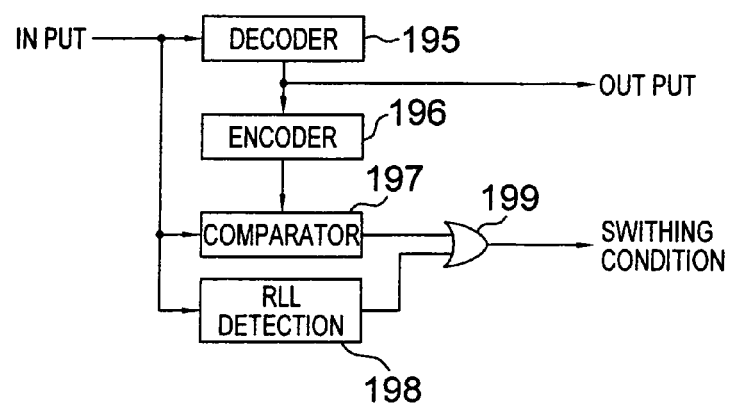
FIG. 16 is a block circuit diagram for explaining an embodiment of a decoder circuit in accordance with the present invention.

Referring to FIG. 15, description will be given of an embodiment of sync detector 14 in which a detecting condition is programmable. Sync A and sync B indicates synchronization codes. Sync detector 14 includes a sync detector 190 for sync A, a sync detector 191 for sync B, a sync detector 192, a selector 183, and a logical sum (OR) circuit 194. Detecting condition 1 is related to an event in which both of sync A and sync. B are detected. Detecting condition 2 is related to an event in which either one of sync A and sync B is detected. Ordinarily, selector 193 delivers detecting condition 1 to detector 192. Detector 192 asserts sync detection output only if both sync A detector 190 and sync B detector 191 detect the respective sync codes. If none of sync A or sync B is detected, OR circuit 194 asserts a switching condition for a sync missing state and notifies the condition. Resultantly, sel signal is set to select selecting condition 2. Sync detector 192 therefore asserts the sync detection output when either one of detectors 190 and 191 detects the associated sync code. In this way, sync detector 14 can be configured with a programmable sync detecting condition. Referring now to FIG. 16, description will be given of an embodiment of decoder 15 to generate switching conditions. Decoder circuit 15 includes a decoder 195, an encoder 196, a comparator 197, an RLL detector 198, and an OR logic 199. Although encoder 196 is identical to encoder 63, different reference numerals are assigned to constituent elements for easy understanding. As already described above, in the data recording, encoder 63 encodes, for example, 8-bit byte data into 9-bit record data for each input data so as to write the data on media 54. In the data reproducing, decoder 195 decodes a bit stream data into a byte data, for example, a 9-bit stream data into 8-bit byte data. When the 9-bit stream data has no errors, 9-bit byte data is directly converted to 8-bit byte data by decoder 195. However, when the 9-bit stream data includes errors, that bit stream data is not assigned into the correct 9-bit string data. Therefore, decoder 195 outputs no-mapping byte data in accordance with the input of a bit stream data. Decoder 195 appropriately converts the bit stream data (e.g., 9-bit stream data) into byte data (e.g., 8-bit byte data), and then, encoder 196 converts decoded byte data into the estimated bit stream data again. If no error is detected, input bit stream data matched into estimated bit stream data. If errors are included in the input bit stream data, the input bit stream data is different from the estimated bit stream. In consequence, some errors in the input bit stream data can be detected by comparing the input bit stream data with the output bit stream data from encoder 196. Comparator 197 accomplishes the bit stream comparison and notifies via OR logic 199.a switching condition for occurrence of a data decoding error.

RLL detector 198 checks a zero run length limitation of the input bit stream data. In the data recording, write bit data stream is eliminated a zero run length, for example, limited to a maximum of consecutive zero is 7 bits of zero. The length of consecutive zero in the input bit stream data to decoder 15 is equal to or more than a predetermined value. Therefore, if no error is detected in the data reproduction, the input data stream to decoder 15 has also a restricted zero run length. If the length of zero run in the input data stream exceeds a predetermined value, RLL detector 198 asserts a switching condition via OR circuit 199. Thanks to this configuration, it is possible to implement decoder 15 to generate various switching conditions.

Figure 17:
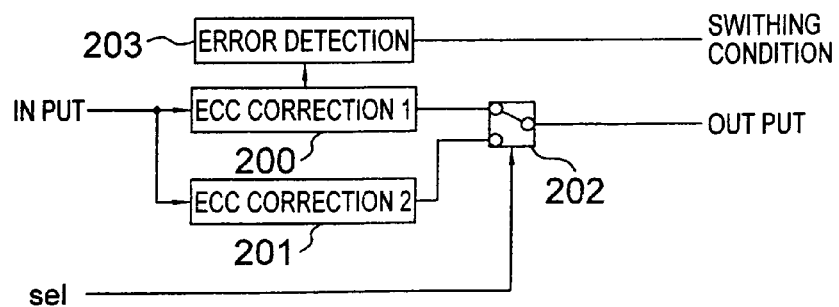
FIG. 17 is a circuit diagram for explaining an embodiment of an error detecting and correcting circuit in accordance with the present invention.

Referring now to FIG. 17, description will be given of an embodiment of ECC circuit 57 having a variable error correcting function. ECC circuit 57 includes ECC corrector circuits 200 and 201, a selector 202, and an error detector circuit 203. ECC correctors 200 and 201 are ECC circuits having respectively different numbers of bytes for error correction. For example, ECC correctors 200 and 201 respectively have correction capability of 12-byte and 20-byte. In an ordinary situation, sel signal is "O" and selector 202 conducts selection to output a result of correction by ECC corrector 200 having lower correction capability. Error detector 203 detects presence of an error, which cannot be corrected by ECC corrector 200. If such a condition occurs, error detector 203 notifies an associated switching condition to microprocessor 55. When the switching condition is asserted, sel signal is set to "1", and a result of correction by ECC corrector 201 having higher correction capability is selected as the output. In the ECC corrector circuits having mutually different error correcting capability, it is possible to change the error correction.

Using circuit components mentioned above, which are As compensation circuit 8, DC compensation circuit 9, equalizer 10, ITR circuit 11, AGC circuit 12, ML detector circuit 13, sync detector 14, decoder 15, and ECC generator and corrector, there can be configured a circuit system having various characteristics. As a result, the first object of the present invention can be achieved due to implement these circuit blocks to the system shown in FIG. 1. Specifically, the data reproduction is carried out in accordance with the stored values in the FIFO circuit 6 in relation to data errors. Using the FIFO circuit 6, the magnetic recording and reproducing apparatus does not immediately need to reproduce signals on media 54. In consequence, if the reproducing signals can be read by changing circuit parameters, the data reproduction is accomplished without increasing latency, thereby the data accessing speed is increased.

In FIG. 1, the data reproduction using the stored values in FIFO 6 is commenced in accordance with error detection using ECC circuit 57. The operation can be started in a similar manner by using an event of detection of thermal asperity by TA detector 17 instead of ECC circuit 57. At detection of thermal asperity by TA detector 17, changing characteristic of DC compensation circuit 9 is naturally rather than the other components, for example, changing the frequency characteristic of equalizer 10.

Figure 18:
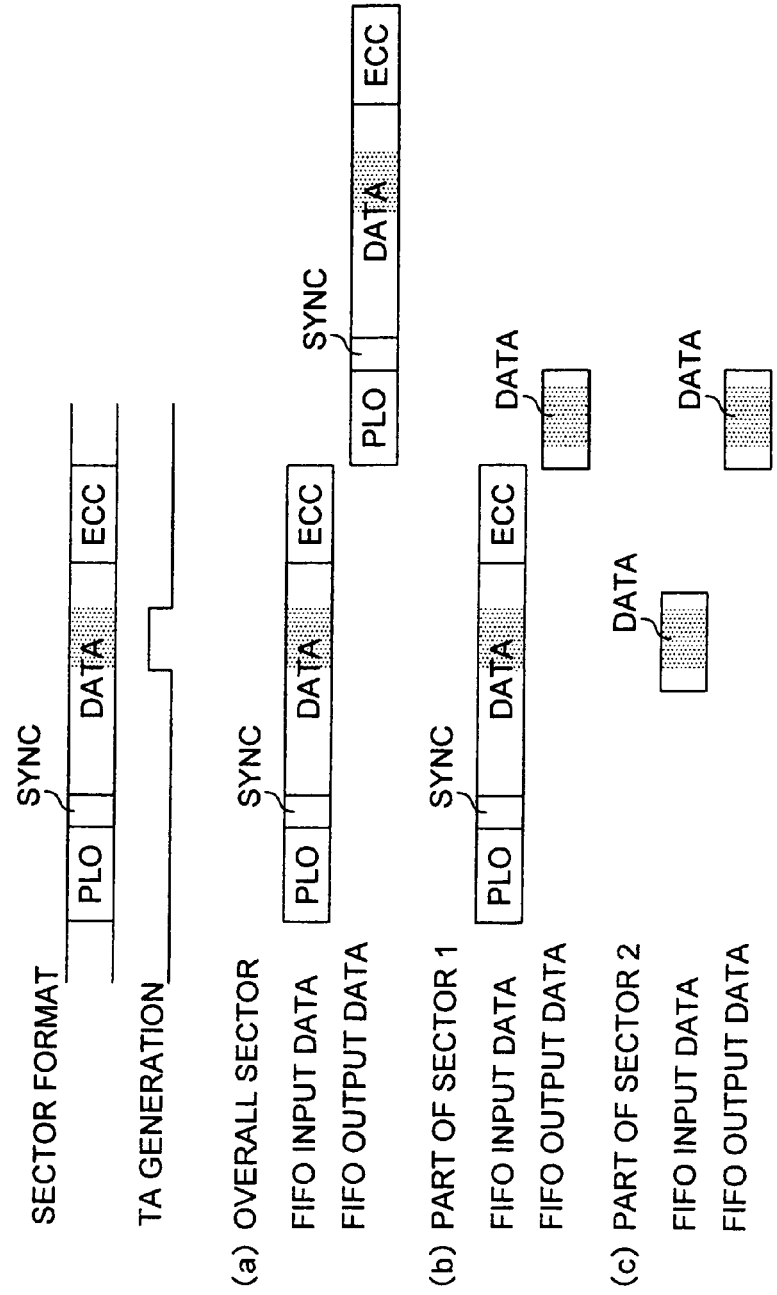
FIG. 18 is a diagram for explaining an embodiment of a data processing method using a first-in-first-out (FIFO) scheme in accordance with the present invention.

To conduct the data reproduction using FIFO 6 as described above, it is possible to use a processing method schematically as shown in FIG. 18. FIG. 18(a) shows a case in which when a data error is detected, the reproduction of a pertinent sector (the unit of data processing is one sector in this case) is conducted entire sector which is stored in FIFO 6.

FIG. 18(b) shows a case in which the reproduction of the data error starts for data before and after the area of the data error. And FIG. 18(c) shows a case in which reproducing data of only the area of the data error is stored in FIFO 6 to thereafter achieve the data reproduction only for the area. The operation will be described in conjunction with the configuration of FIG. 1. In the description, a condition to detect occurrence of a data error, namely, a switching condition assumes using TA detector 17 to detect thermal asperity in a sector.

First, operation of FIG. 18(a) will be described. In the ordinary read-operation at time of operation 1, sampled value using-AD circuit 4 is transmitted to As compensation circuit 8 and subsequent data detecting circuits, and also is simultaneously sent to FIFO 6. FIFO 6 stores the data beginning at a start point of the sector. When a TA detection signal occurs during the data reproduction at timing shown in FIG. 18(a), register 20 becomes "1" at a rising edge of TA occurrence signal. When the reproduction of one sector is completed using notification from controller 51, microprocessor 55 reads register 20 in order to check occurrence of thermal asperity. At occurrence of thermal asperity, the data reproduction is achieved with data of FIFO 6 at time of operation 2. To conduct the data reproduction with stored data in FIFO 6 at time of operation 2, microprocessor 55 sets sel signal to "1" via register 20. Resultantly, for example, coefficients of equalizer 10 are changed from coefficient group 1 to coefficient group 2 and hence the frequency characteristic of equalizer 10 is altered. To conduct data processing with stored data in FIFO 6, controller 51 asserts the read gate. At time of operation 2, FIFO 6 outputs stored data beginning from its start point, i.e., entire sampled data of a sector. Circuit components following As compensation circuit 8 conducts stored data in FIFO 6 to obtain detecting data. Detecting data is again stored in RAM 56, namely, the previously detecting data is discarded, and ECC circuit 57 concurrently conducts the error detection and correction for reproducing data from FIFO 6. Processing after this point has already been described. Although the processing method is accompanied by a disadvantage that the data of one sector is again processed after occurrence of the error at time of operation 2 and hence the processing time is elongated, the processing method of controller 51 is advantageously simplified.

Next, processing of FIG. 18(b) will be described. As can be seen from operation at time of operation 1, FIFO 6 stores the entire sampled data of a sector as mentioned in FIG. 18(a). Register 20 for TA detection records a position of occurrence and a pulse width of the TA detection signal after assertion of the read gate. This kind of circuit can be configured with general counters and hence will not be shown in the drawings. The circuit counts a clock from read synthesizer 5 as reference of data transfer after the read gate assertion. The count value at occurrence of the TA detection signal is easily obtained an error data range. When read operation of a sector is completed at time of operational, microprocessor 55 confirms information in register 20 and detects the occurrence of thermal asperity. Then, microprocessor 55 sets sel signal to "1". In accordance with the position of occurrence of the TA detection signal recorded in register 20, microprocessor 55 sets a start position to output sampled data from FIFO 6 via register 20 to FIFO 6. The start position to be set to FIFO 6 is a position slightly before the position of occurrence of the TA detection signal. Setting of the start position needs to be considered the synchronizing time of ITR circuit 11 and AGC circuit 12, the detecting delay time of ML detector circuit 13, and the byte synchronizing position of sync detector 14. After setting of the start position of FIFO 6 is established, controller 51 executes again the reading operation at time of operation 2 and detects by the detecting circuit following As compensation circuit 8 only the data in the area in which the TA event occurred. At this point, controller 51 replaces only previous byte data associated with the position and the length of occurrence of the TA signal with reproduced data using stored data in FIFO 6. Finally, resultant data of one sector in RAM 56 is constructed of the data of operation 1 obtained by partly replacing the byte data and the reproduced data of operation 2. ECC circuit 57 again conducts the error detection and correction for the entire sector data. Operation after this point has already been described. In this processing method, although the data processing method of FIFO 6 and controller 51 becomes complex, data only at the position of TA occurrence is detected at time of operation 2 and hence the processing time is minimized when compared with the method of FIG. 18(a).

Next, processing of FIG. 18 (c) will be described. In this operation, FIFO 6 stores sampled data in a range from a point of time slightly before the TA detection signal is asserted to a point of time when the signal is negated. Register 20 stores the starting position and the length of the TA detection signal as in the method of FIG. 18(b). The data record length before the assertion of the TA detection signal is determined in the same way as for FIG. 18(b). Microprocessor 55 recognizes TA occurrence in accordance with information of register 20 and requests controller 51 to again execute the reading operation. Controller 51 asserts the read gate again. As comparator 8 and subsequent data detecting circuits processes only stored data in FIFO 6 at the time of operation 2, namely, sampled data only when the TA detection signal is active. Like in the method of FIG. 18(b), controller 51 replaces only the processed data with part of data reproduced at time of operation 1 and stores resultant data in RAM 56. ECC circuit 57 conducts the data detection and correction for the entire sector data stored in RAM 56. Operation after this point has already been described. In this method, data only at the position of TA occurrence can be decoded in the same processing time as for the method of FIG. 18(b). The data storage amount of FIFO 6 is associated with the length of the TA detection signal and hence can be reduced when compared with the methods of FIGS. 18(a) and (b), which enables minimization of the circuit size.

The first object of the present invention can be achieved by the signal processing circuit and the signal processing procedure described in conjunction with FIG. 1.

Description will now be given of a procedure of a coefficient learning method of equalizer 10 shown in FIG. 1. The leaning method of this embodiment is different from the conventional coefficient learning in which a data reproducing operation is repeatedly conducted for a plurality of sectors. Namely, the coefficient learning is accomplished in accordance with data stored in FIFO 6. Specifically, to reproduce signal in one sector on a track on media 54, controller 51 asserts the read gate. When the gate is asserted, signal from media 54 is processed by the analog circuit and is then sampled by AD circuit 4. While the sampled data is being stored in FIFO 6, the data is also detected by the data detecting circuits following As compensation circuit 8. Adaptive coefficient circuit 18 updates, in accordance with the error value between the output value from ITR circuit 11 and the target value of ITR circuit 11. When the reproduction is completed for one sector, FIFO 6 finishes storing sampled data, and adaptive coefficient circuit 18 once terminates the updating of coefficients. Microprocessor 55 then updates sel signal via register 20 and connects an output of FIFO 6 to an input of As compensation circuit 8. And then, controller 51 reasserts the read gate. FIFO 6 outputs sampled data to As compensation circuit 8 and following detecting circuits include adaptive coefficient circuit 18. The adaptive coefficient circuit 18 restarts updating of coefficients based on the previous coefficients. When the processing of the sampled data is completed up to the associated position, controller 51 negates the read gate and adaptive coefficient circuit 18 once finishes the updating of coefficients. Controller 51 again asserts the read gate and then conducts the coefficient learning operation. After the learning is repeatedly executed with the sampled data in FIFO 6 for predetermined times, microprocessor 55 switches sel signal "1" to "0", and controller 51 again executes reproducing operation of a sector on media 54. While the sampled data of a sector signal is being stored in FIFO 6, adaptive coefficient circuit 18 updates coefficients using the sampled data. And then, microprocessor 55 and controller 51 conducts the learning with the sampled data in FIFO 6. Through repetitious execution of the operation above, the coefficients of equalizer 10 are optimized by adaptive coefficient circuit 18. This embodiment conducts, in place of the conventional coefficient learning in which signals are repeatedly read from sectors on media 54, the coefficient learning with sampled data in FIFO 6 and hence the coefficient learning time is reduced.

Description will now be given of a procedure to search out defect or dropout of media 54 in the apparatus of FIG. 1 and a method of registering the defect. In a general magnetic recording and reproducing apparatus, an area of defect on medium 54 is determined as follows. The signal reproduction is conducted for a plurality of sectors while changing circuit parameters of the detecting circuit to resultantly assume a sector having low read margin as a defective-area. Therefore, the read operation to same sector needs to be consecutively achieved for each changing circuit parameters. In this embodiment, for example, as in the coefficient learning method above, signal reproduced for a particular sector on media 54 is stored as sampled data in FIFO 6, and the sampled data of FIFO 6 is reproduced by changing circuit parameters of As compensation circuit 8 and subsequent circuits. Specifically, controller 51 asserts a read gate in order to obtain reproduce signal of one sector on a track on media 54. When the gate is asserted, signal from head 53 is processed by the analog circuit above and is then sampled by AD circuit 4 as sampled data. While the sampled data is stored in FIFO 6, the sampled data is detected by detection circuits which are As compensation circuit 8 and subsequent circuits. When one sector of reproduction data processing on media 54 is finished, for example, ECC circuit 57 checks data error. Controller 51 switches sel signal "1" to "0" via register 20, and the output data from FIFO 6 is resultantly fed to detecting circuits following As compensation circuit 8. Microprocessor 55 changes characteristics of. As compensation circuit 8 and subsequent signal processing circuits, for example, target amplitude of AGC circuit 12. And then, Microprocessor 55 requests starting the data reproduction to controller 51. When controller 51 asserts again the read gate, the data detecting operation is accomplished with the sampled data of FIFO 6 in accordance with various characteristics of As compensation circuit 8 and subsequent circuits. The procedure above is repeatedly conducted to obtain detected data. In accordance with the results, microprocessor 55 analyzes distribution of data errors in the sector and attains information of the position and the length of the defective area on media 54. Microprocessor 55 recognizes the defective area according to the information. Thanks to the processing procedure, the reproduction of data from media 54 does not need to repeatedly carry out in while changing each circuit parameters. The defective area can be therefore found out by achieving at least once the reproducing operation from media 54.

Figure 2:
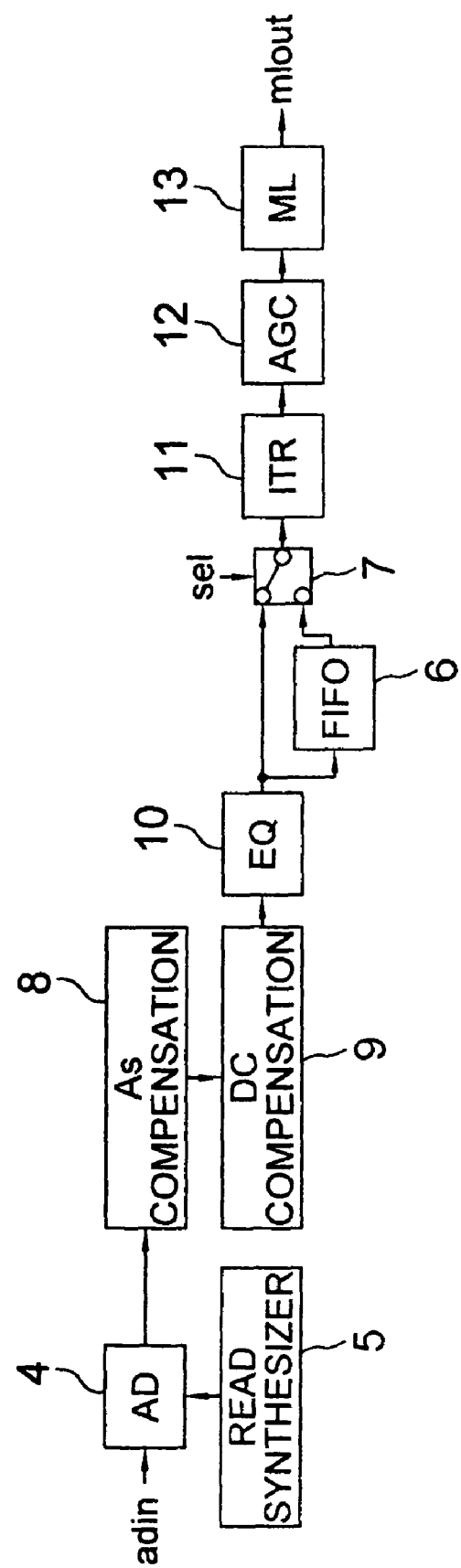
FIG. 2 is a block diagram showing a constitutional example of another reproducing circuit in accordance with the present invention.

Referring next to FIG. 2, description will be given of another example of constitution of the signal detecting circuit in which the location of FIFO 6 is changed. In FIG. 2, FIFO 6 is connected to an output from equalizer 10. In the configuration, the same components as those of FIG. 1 are assigned with the same reference numerals. In FIG. 2, adin signal is an analog input signal obtained from LPF circuit 3 in which described above in FIG. 1. AD circuit 4 samples adin signal in accordance with sampling clock signal produced from read synthesizer 5, which is asynchronous to adin signal. AD circuit 4 outputs sampled signals as sample data to As compensation circuit 8. The function of As compensation circuit 8, DC compensation circuit 9, and equalizer 10 described above. Equalizer 10 outputs equalized data to eliminate inter symbol interference of the input signals. The equalized data are simultaneously fed to selector 7 and FIFO 6. The data of an objective sector is stored in FIFO 6 at the beginning of the sector data. In ordinary data reproduction, sel signal of register 20 is set to "0" and the output from equalizer 10 is connected to the input of ITR circuit 11 using selector circuit 7. ITR circuit 11 digitally processes interpolation data synchronized in frequency and phase in accordance with equalized data from equalizer 10. AGC circuit 12 controls the amplitude of interpolated data to stay within a fixed range. Resultant data is detected by ML detector circuit 13 in the Maximum-Likelihood detecting manner and are delivered as mlout signal to sync detector 14.

If an error is detected, for example, using ECC circuit 57, the read operation is again started. Microprocessor 55 sets sel signal to, for example, "1" via register 20. As a result, the data of FIFO 6 is supplied to ITR circuit 11, and the characteristic of detecting circuit, which is at least either one of ITR circuit 11, AGC circuit 12, and ML detector circuit 13, is modified as described above. The data of FIFO 6 is processed by ITR circuit 11, AGC circuit 12, and ML detector circuit 13 respectively having different characteristics and is outputted as mlout signal to sync detector 14. The first object of the present invention can be achieved also by this embodiment through processing similar to that of FIG. 1.

Figure 3:
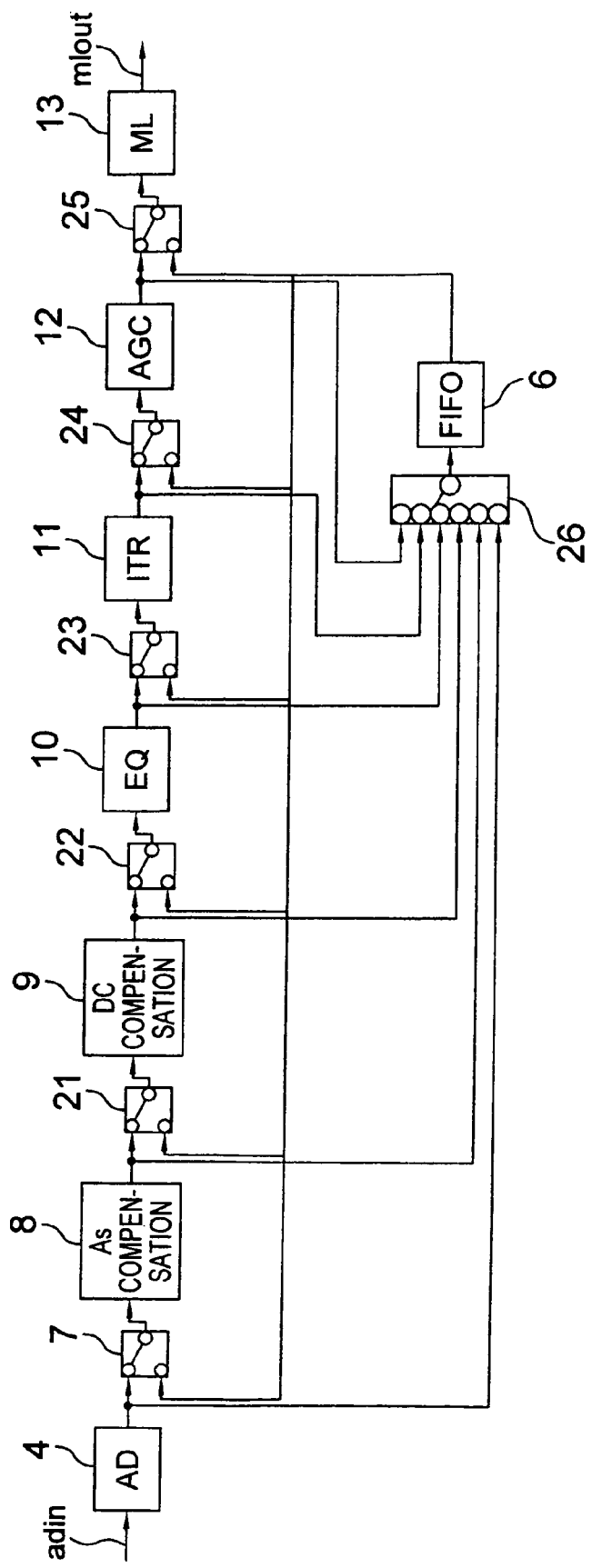
FIG. 3 is a block diagram showing a constitutional example of another reproducing circuit corresponding to the circuit of FIG. 2.

For the processing of FIG. 1, the location of FIFO 6 can be changed as shown in FIG. 3. FIG. 3 shows an embodiment for the operation and includes 2-to-1 selector circuits 21 to 25 and a 6-to-1 selector 26. The same constituent components as those of FIG. 1 are assigned with the same reference numerals. Selector circuits 7 and 21 to 25 are disposed on input sides of As compensation circuit 8, DC compensation circuit 9, equalizer 10, ITR circuit 11, AGC circuit 12, and ML detector circuit 13, respectively. A selector circuit 26 is connected to each output of the circuit and an input of FIFO 6. The selector circuits are controlled by mutually independent selection signals. In ordinary read operation, the output from AD 4 is serially processed through As compensation circuit 8, DC compensation circuit 9, equalizer 10, ITR circuit 11, AGC circuit 12, and ML detector circuit 13. Selector 26 selects either one of the outputs from these detector circuits, and FIFO 6 stores the selected data. In retry read operation, stored data in FIFO 6 is processed by selected circuit, which is connected to FIFO 6 and is selected only one of selector circuits 7 and 21 to 25. For example, in ordinary read operation, selector 26 selects the output of equalizer 10, and other selectors 7 and 21 to 25 does not select output data of FIFO 6. Specially, output of equalizer 10 is connected to input of ITR circuit 11 by using selector 23. In retry read operation, the control operation is accomplished such that only selector 23 feeds the output data from FIFO 6 to ITR circuit 11. And also, selector 24 and 25 does not select the output data of FIFO 6. Therefore, output data from ITR circuit 11 is processed on AGC circuit 12 and ML detector 13. It is to be understood that this example also achieves data reproduction in almost the same way as for FIG. 2. Similarly, to modify the characteristic of only ML detector circuit 13, selector 26 selects the output from AGC circuit 12 to store in FIFO 6 in ordinary read operation. In retry operation, only selector 25 selects the output from FIFO 6. In accordance with the embodiments shown in FIGS. 2 and 3, the operation range of each circuit can be changed for each cause of data errors. For example, when it has been known from experience that data errors occurs due to unstable phase locking operation, the sampled data in FIFO 6 need only to be processed in the retry operation by ITR circuit 11 and subsequent data decoding circuits. Equalizer 10 and other circuits are not related to the operation. Therefore, power consumption can be reduced by selectively operating only the necessary circuits in the retry operation.

Figure 19:
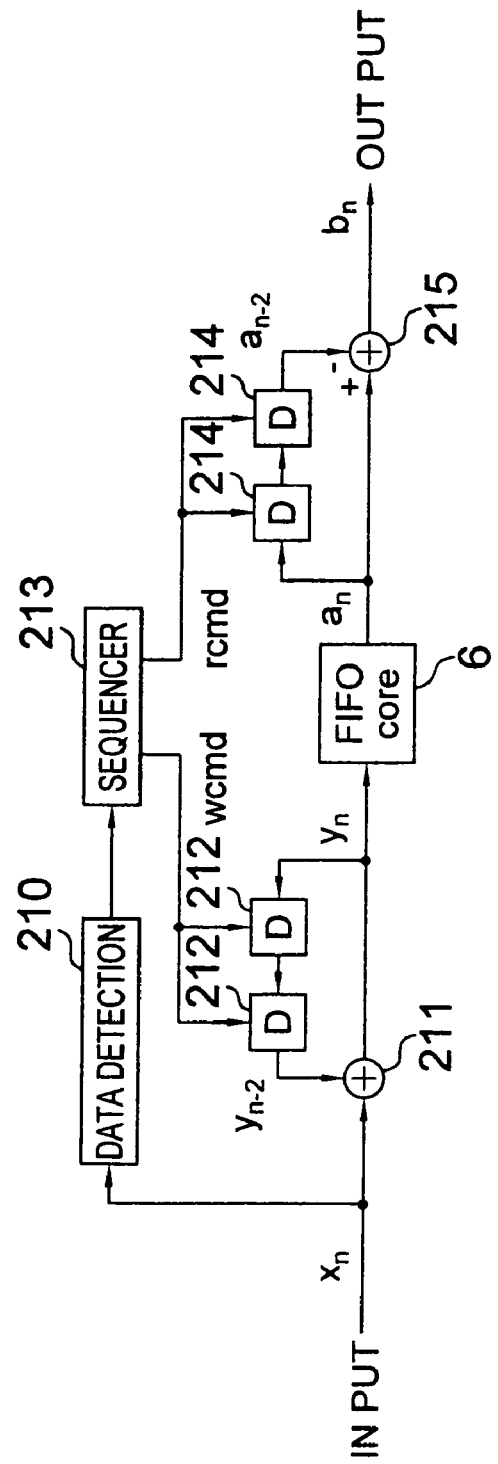
FIG. 19 is a block diagram for explaining an example of a FIFO circuit in accordance with the present invention.
Figure 20A:
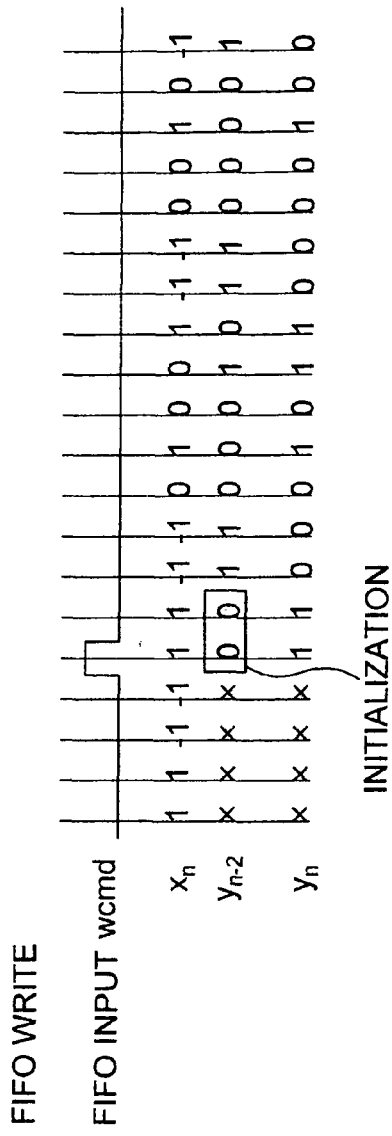
FIGS. 20A and 20B are diagrams for explaining an example of input and output signals of the FIFO circuit.

Referring now to FIG. 19, description will be given of an embodiment of a circuit configuration in which FIFO 6 is reduced in circuit size. This embodiment includes an arithmetic circuit between the input and output of FIFO core circuit 6, for which minimize the number of bits to be stored in FIFO 6. FIG. 19 includes a data detector circuit 210, an adder 211, delay circuits 212 and 214, a sequencer 213, and a subtractor 215. Input data x(n) to the FIFO circuit is digital data represented in the form of signed 2's complement. In accordance with a channel characteristic of the magnetic recording and reproducing apparatus, data x(n) has a correlation of (+1, 0, −1) in the partial response class 4. This means that when "+1" occurs in the input signal at time n, no correlation exists at time (n+1), and "0" or "−1" occurs at time (n+2) due to a combination of the signal sequence. The number of bits to be stored in FIFO 6 is reduced in accordance with the correlation of input data. Data detector 210 checks data of x(n). For example, for x(n)>0.5, data is assumed to be "+1". For x(n)<0.5, data is assumed to be "−1". In other cases, data is assumed to be "0". Detector 210 outputs the data to sequencer 213. Since the data in the PLO region at the beginning of the sector includes a consecutive pattern of (+1, +1, −1, −1), sequencer 213 detects a data series in accordance with the result of detection by detector 210 and outputs wcmd signal at timing as follows. As shown in FIG. 20(a), after the read gate is asserted, sequencer 213 detects (+1, +1, −1, −1) and outputs wcmd signal at a subsequent point of timing. Delay circuit 212 delays output y(n) from adder 211 for two clock samples to 'add' the delayed signal to adder 211. After wcmd signal is asserted, y(n−2) is kept "0" for two clock samples. Adder 211 adds x(n) and y(n−2) to deliver output yn to FIFO core 6. When the operation is thereafter repeated, output y(n) from adder 211 becomes as shown in FIG. 20(a), i.e., an unsigned signal stream. After wcmd signal is asserted, data is written in FIFO 6. Consequently, the number of bits of data stored in FIFO 6, i.e., y(n) includes five bits if input x(n) includes six bits. Namely, the number of output bits is one bit less than that of input bits.

Figure 20B:
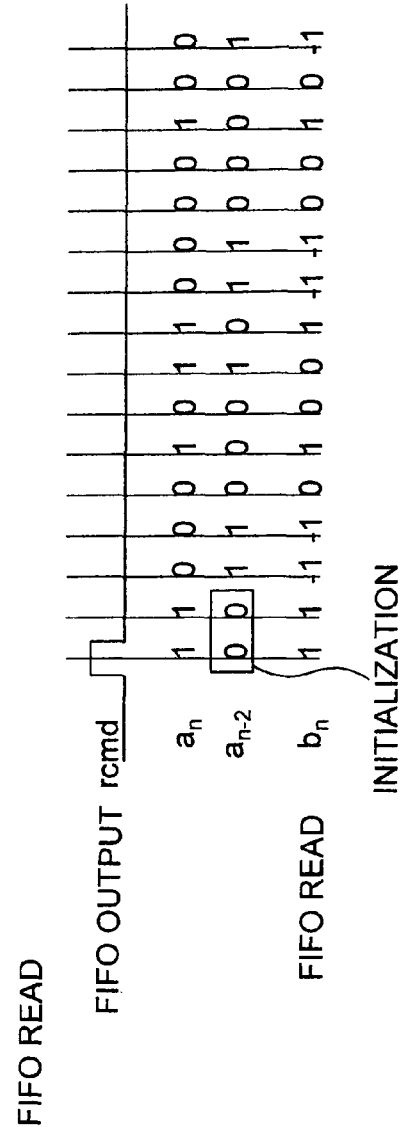

When data is desired to be read from FIFO 6, b(n) is required to be identical to original data of x(n). Data b(n) is restored from digital data a(n) from FIFO 6 and output a(n−2) from delay circuit 214 using subtractor 215. On receiving a read gate signal, sequencer 213 generates rcmd signal to clear delay circuit 214. Subtractor 215 conducts subtraction between data a(n) from FIFO 6 and output a(n−2) from delay circuit 214 to output resultant data b(n). FIG. 20(b) shows an example of this operation. After rcmd signal is asserted, a(n−2) is "0" for two clock samples. Output a(n) is same as y(n) of FIG. 20(a). As output b(n), a(n−2) is subtracted from a(n). Comparing b(n) with FIG. 20(a), it is to be understood that there are obtained the same values. The operation above is expressed as follows.

$$y(n)=x(n)+y(n-2) \quad (5).$$

Since b(n)=a(n)−a(n−2), y(n)=a(n) and y(n)−y(n−2)=x(n), [0104] there is obtained, b .function. (n)=.times. x .function. (n)+y .function. (n−2)−x .function. (n−2)−y .function. (n−4)=.times. x .function. (n).

As implied by the expression above, even if the circuits are additionally used, b(n) equal to x(n). It is consequently possible to output sample data delayed while minimizing the circuit size due to reduction of the number of bits to be stored in FIFO 6.

In the detecting circuit of the embodiments above, selector circuit 7 is used to conduct changeover between conventional circuits in the retry operation. However, for example, when consecutive sectors are to be processed in a magnetic disk drive, the processing of sectors is interrupted by the retry in the configuration above. When reproducing operation of successive two sectors which the first of sector has an error, the pertinent processing circuit retries the detecting for the first sector with data from FIFO 6. Therefore, the data detecting of the second sector is interrupted. The second sector is detected after lapse of disk latency, which lowers the disk access speed.

Figure 4:
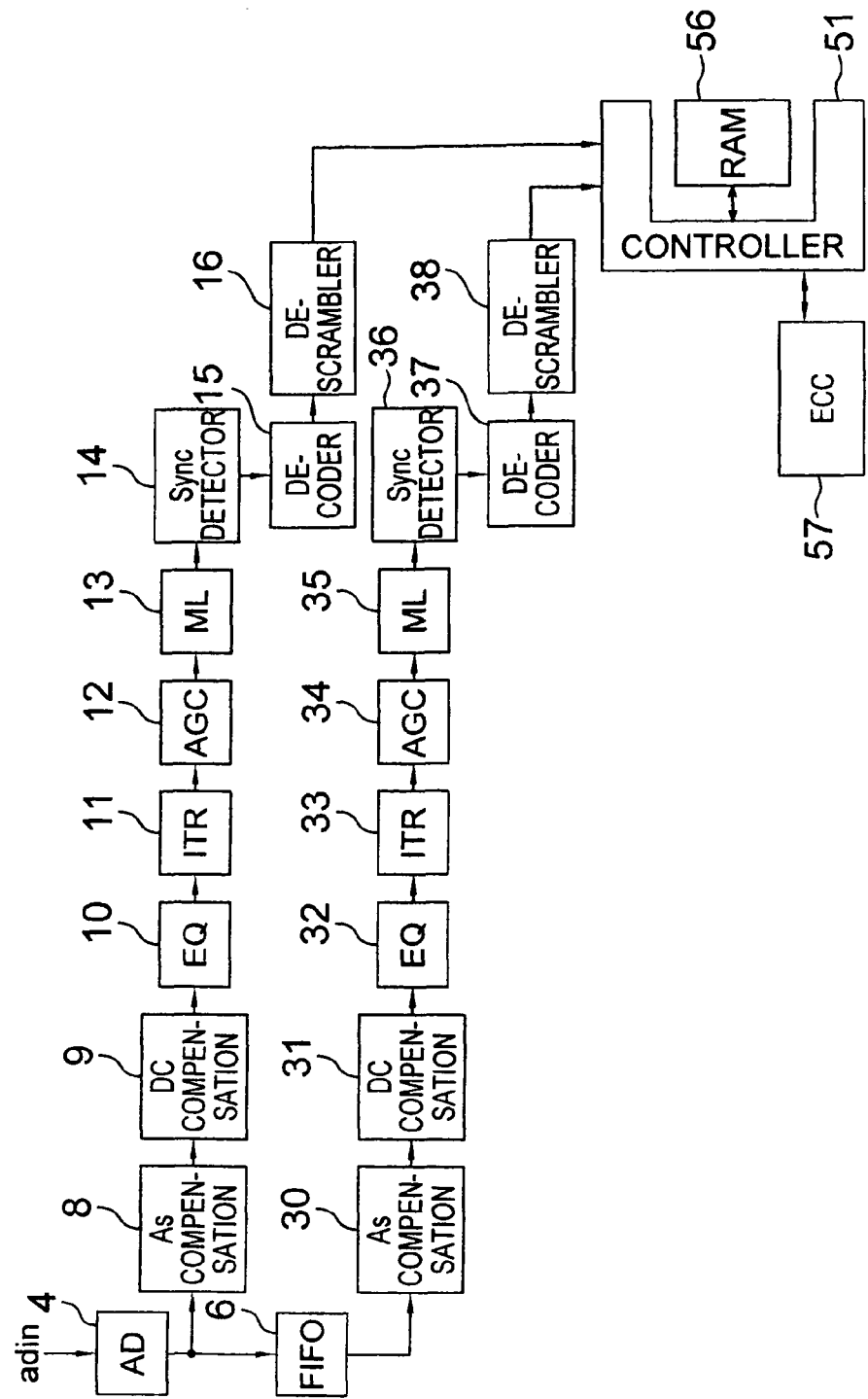
FIG. 4 is a block diagram showing a constitutional example of a reproducing circuit to achieve consecutive sector processing in association with the circuit of FIG. 2.

FIG. 4 shows an embodiment of a signal processing circuit to prevent the disadvantage. The embodiment includes an As compensation circuit 30, a DC compensation circuit 31, an equalizer 32, an ITR circuit 33, an AGC circuit 34, and a ML detector circuit 35. These components are in configuration equal to the respectively associated components including As compensation circuit 8, DC compensation circuit 9, equalizer 10, ITR circuit 11 AGC circuit 12, and ML detector circuit 13 and have mutually different characteristics as compared with the associated components. Although a sync detector 36, a decoder 37, and a de-scrambler 38 have the same functions respectively as those of sync detector 14, decoder 15, and de-scrambler 16, different reference numerals are assigned for easy understanding.

Description will be given of operation of the circuit components to continuously process data of two successive sectors. FIFO 6 is assumed to possess a data capacity only for sample data of two sectors. Ordinarily, data of first sector is fed to AD circuit 4, and the data is delivered to As compensation circuit 8 to obtain data from de-scrambler 16. Simultaneously, the data is stored in FIFO 6. Controller 51 stores data of the first sector from de-scrambler 16 and concurrently detects errors in the data by ECC circuit 57. Sampled data of the second sector is processed by As compensation circuit 8 and subsequent circuits to be outputted as reproduced data to de-scrambler 16 and is simultaneously stored in FIFO 6. If ECC circuit 57 detects a data error in the first sector, sampled data of the first sector beforehand stored in FIFO 6 is detected by As compensation 30 and subsequent circuits to be fed to de-scrambler 38. Since the associated detecting circuits have mutually different characteristics, the operations thereof are the same as those above and hence description thereof will not be necessary. Controller 51 stores data of the second sector from de-scrambler 16 and data of the first sector from de-scrambler 38 in respectively different areas of RAM 56. ECC circuit 57 attempts to correct the error with the data of the first and second sector in RAM 56. If a data error is also detected in the second sector, data reproducing operation is again accomplished with the sampled data in FIFO 6 by As compensation 30 and subsequent circuits.

Using the detecting circuits to separately process a sector, there can be constructed a data reproducing apparatus which conducts the processing for one sector error without any deterioration in the disk access time. Additionally, when three units of such detecting circuit are constructed in parallel manner, it is naturally possible to cope with up to two sector errors without deteriorating the disk access time.

Figure 5:
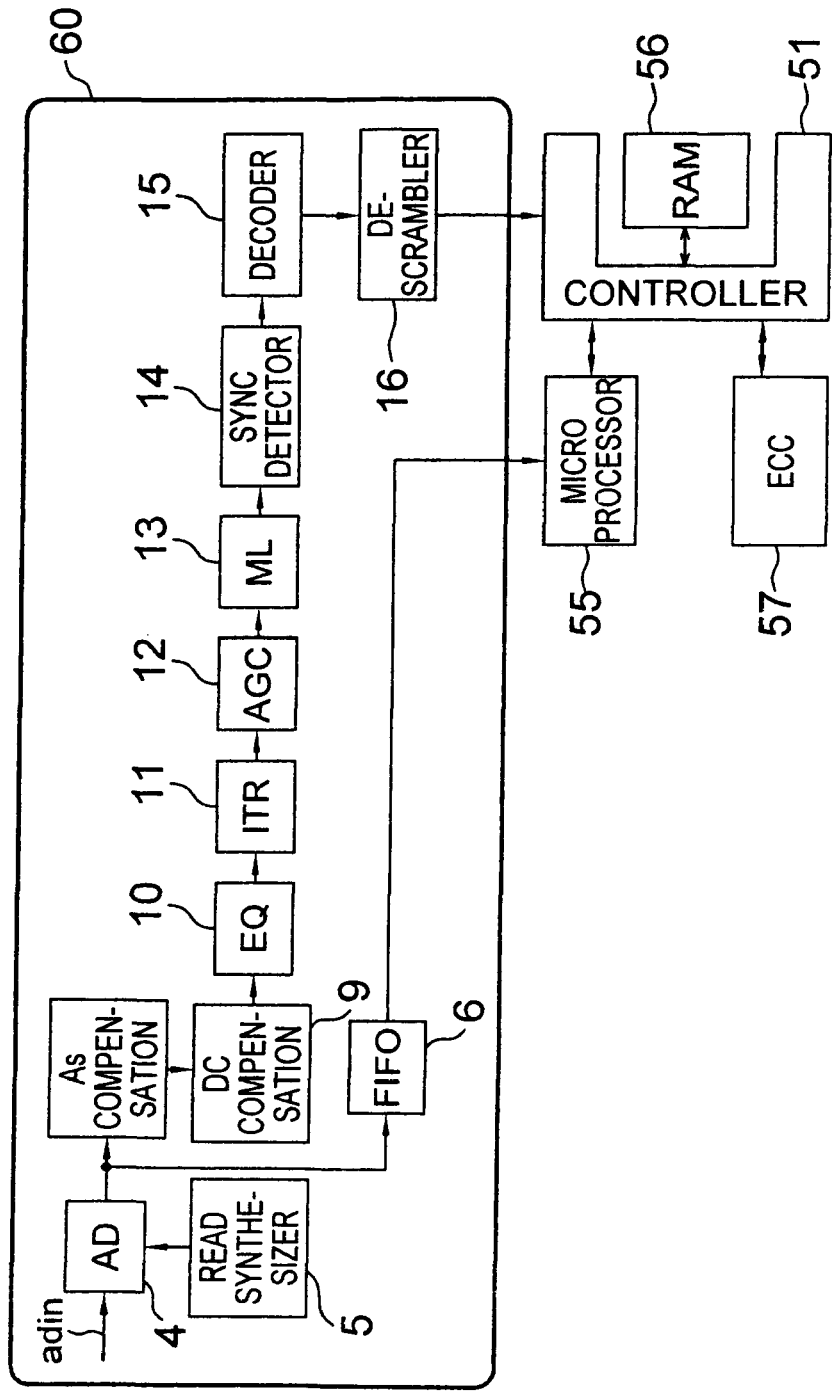
FIG. 5 is a block diagram showing a constitutional example of another reproducing circuit corresponding to the circuit of FIG. 4.
Figure 21:
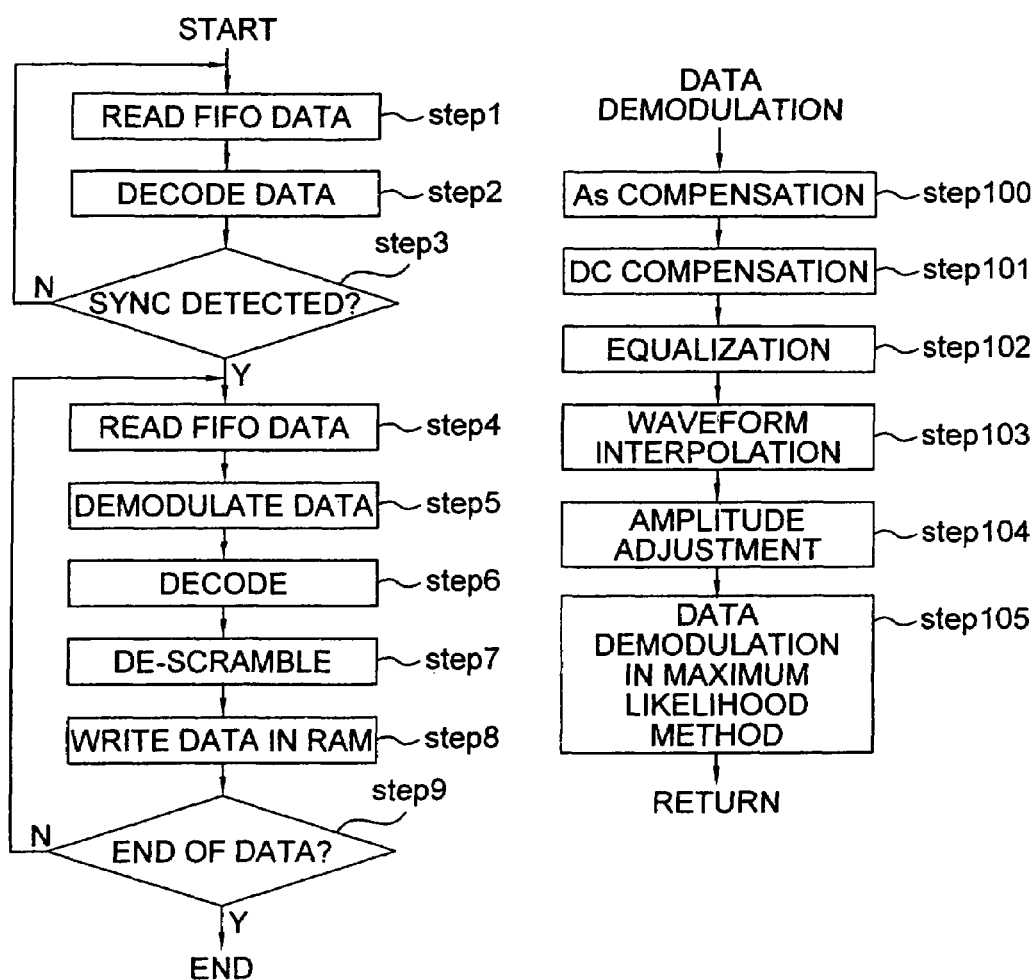
FIG. 21 is a flowchart showing a software processing procedure in accordance with the present invention.

In accordance with the embodiment, even a data error occurrence in the ordinary data processing can be continuously processed. The detecting circuits can be concurrently conducted for the sector in which the data error occurred. Consequently, the data access time can be kept unchanged. The embodiment includes detecting circuits in a parallel fashion. However, the advantageous processing can be similarly carried out by a configuration of an embodiment of the present invention shown in FIG. 5. Specifically, FIG. 5 shows an embodiment of constitution to conduct by software the data reproduction in the retry operation. For easy understanding, it is assumed to be determined a data error by ECC circuit 57. Signal from head 53 is fed via the signal processing circuits to be supplied as adin signal to AD circuit 4. In response to sampling clock signal from read synthesizer 5, AD circuit 4 samples adin signal asynchronously supplied with respect to the input signal frequency, and the sampled signal is delivered as sampled data to FIFO 6 and As compensation circuit 8. Data demodulation conducted by As compensation circuit 8 and subsequent circuits is the same as the demodulation described above and hence description thereof will be avoided. While data from de-scrambler 16 is being temporarily stored in RAM 56 via controller 51, ECC circuit 57 detects errors in the data. If an error is resultantly detected, ECC circuit 57 attempts to correct the data using the data of RAM 56 and syndrome information obtained at data error detection. If the error exceeds error correction capability of ECC circuit 57, controller 51 requests to microprocessor 55 in order to conduct a data detecting operation with stored data in FIFO 6. Microprocessor 55 accomplishes the data reproduction using processing procedure as shown in FIG. 21. After processing data using microprocessor 55, ECC circuit 57 again conducts the data error detection and then error correction. Description will now be given of a software processing procedure of microprocessor 55. Beforehand stored in FIFO 6 is sampled data beginning at the first position of the sector. Microprocessor 55 reads each sampled data to execute processing as follows.

Microprocessor 55 reads sampled data from FIFO 6 in step 1 and conducts a data detecting operation in step 2. That is, microprocessor 55 compensates amplitude asymmetry of the sampled data in step 100 and eliminates direct-current (DC) component of sampled data by a filter in step 101. To equalize the sampled data, microprocessor 55 conducts to remove inter symbol interference within sampled data in step 102, conducts to interpolate sampled data to generate synchronously sampled data from asynchronously sampled data in step 103, and achieves amplitude adjustment for the sampled data in step 104. Finally, microprocessor 55 carries out ML detection procedure using attained data in step 105. After the processing above is finished, microprocessor 55 repeatedly tries in step 3 to detect a particular pattern, i.e., a sync code for byte synchronization. When sync code is detected, microprocessor 55 reads sampled data from FIFO 6 in step 4, accomplishes a data detecting operation in step 5. Microprocessor 55 decodes the obtained data using decoding table in step 6, de-scrambles resultant data in step 7, and saves detecting data into RAM in step 8. In step 9, microprocessor 55 checks the end of processing data of a sector, and passes control to step 4 as processing for remained data. It is to be understood that the data processing conducted by As compensation circuit 30 and subsequent circuits is achieved by software procedures as above. Consequently, when the data reproduction is conducted for the retry, microprocessor 55 conducts the data while replacing the parameters, which determine characteristics of data reproducing in steps 100 to 105 respectively. The parameters for steps 100 to 105 are same parameters of described above detecting circuits, which are As compensation circuit 8, DC compensation circuit 9, equalizer 10, ITR circuit 11, AGC circuit 12, and ML detector circuit 13. Especially, in the data detecting method achieved by software as described in conjunction with the embodiment, the respective parameters can be easily modified and hence the data detecting can be carried out with a plurality of combinations of different parameters. Consequently, data read capability is advantageously increased in accordance with the embodiment.

Figure 22:
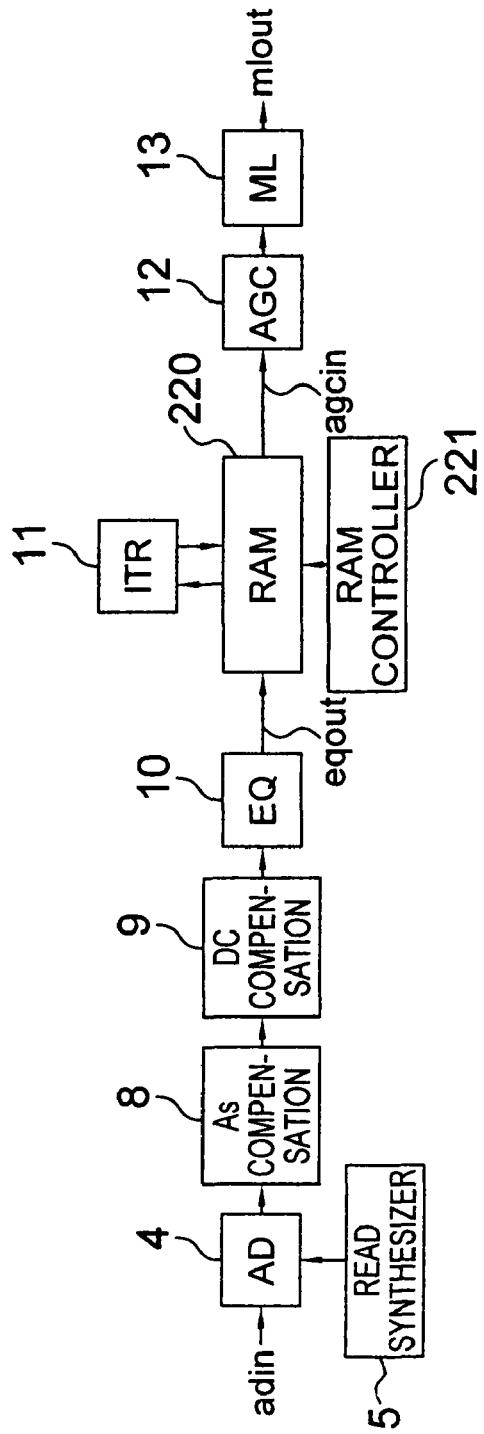
FIG. 22 is a block diagram for explaining an embodiment of a reproducing circuit using a RAM in accordance with the present invention.

Next, description will be given of an embodiment of a detecting circuit including a combination of a memory and a detecting circuit. FIG. 22 shows an example of a detecting circuit in which a memory is combined with a phase locked loop circuit. The configuration of FIG. 22 includes a RAM 220 and a RAM controller 221. The other circuits, which are the same as those of FIG. 1, are assigned with the same reference numerals. In the embodiment, a memory circuit is combined with an ITR circuit, which repeatedly conducts a phase locking or synchronizing operation to improve precision of the operation. Sampled data from AD circuit 4 is delivered to RAM 220 as eqout signal through As compensation circuit 8, DC compensation circuit 9, and equalizer 10.

Figure 23:
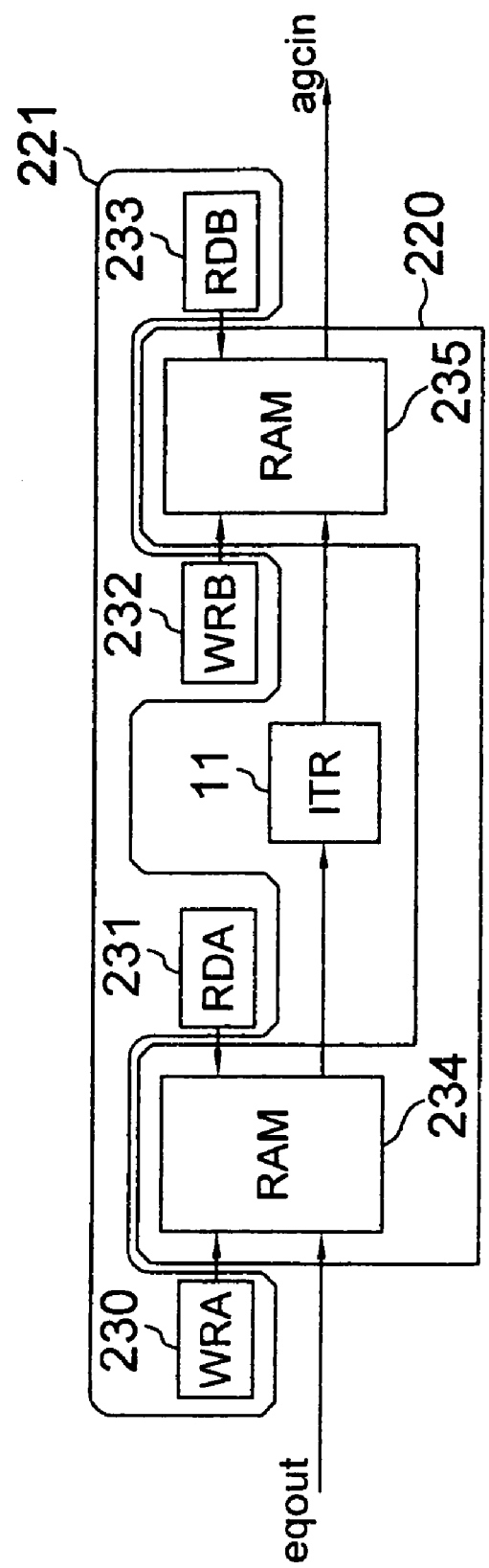
FIG. 23 is a block diagram for explaining an example of a peripheral circuit configuration of the RAM in accordance with the present invention.

FIG. 23 shows an example of specific configurations of ITR circuit 11, RAM 220, and RAM controller 221 in which further includes address generators 230 to 233. Eqout data, which is the output from equalizer 10 and is fed to a RAM 234, is stored at address denoted by address generator 230. The data is once read therefrom RAM 234 at address indicated by address generator 231 and is then conducted by ITR circuit 11. Interpolated data from ITR circuit 11 is then stored in a RAM 235 at address designated by address generator 232. The data is again read therefrom in response to an address from generator 233 to be outputted as agcin data to AGC circuit 12. The data is adjusted in amplitude to be then detected by ML detector circuit 13. In the construction, address generators 230 and 233 serve as address counters to constitute a usual FIFO circuit. ITR circuit 11 and address generators 231 and 232 are configured to improve precision of the phase locking operation in the embodiment.

FIG. 24 specifically shows an address generating procedure. Address pointers of RAM 220 is denoted in wr_a and rd_a for address control of RAM 234, and wr_b and rd_b for address control of RAM 235. Data structure in RAM 234 mainly includes a variable raw_data to memorize eqout data and a work area variable of ITR circuit 11. The variable of ITR circuit 11 includes, for example, a variable filter_internal as a storage variable (contented data of delay circuit 142) of digital filter 127, and a variable nco_internal as a storage variable (contented data of delay circuit 146) of integrator 128 shown in FIG. 9. In step 1, each address pointer is initialized, which is executed only at assertion of a read gate. In the procedure, N_offset indicates processing delay time for iterative processing. Steps 2 to 6 are executed at each time to receive eqout data. In step 2, eqout data is written in raw_data denoted by address pointer wr_a. In step 3, adc_in data is read from RAM 234 at address pointer rd_a. In step 4, processing is con-trolled by variable fixed_start. If the variable is "true", N_delay is subtracted from each of address pointers rd_a and wr_b to resultantly restore the address pointers. Data raw_data pointed between rd_a and (rd_a+N) are cleared, and data nco_internal are also fixed to fixed_nco. The processing is conducted to prepare, for example, at assertion of a thermal asperity signal, an operation to conduct data interpolation by the ITR circuit using data stored in RAM 234. In step 5, data in the work area denoted address pointer rd_a are processed by function itr( ). Interpolated data, which is returned value from function itr( ), is stored in RAM 235 at address pointer wr_b. After the steps 4 and 5, input data to ITR circuit 11 ranging from rd_a to (rd_a+N) are cleared to zero and hence the phase control is hold. Resultantly, interpolated data, which is sampled at a fixed period (sampling interval denoted by fixed_nco), is outputted from ITR circuit 11. In step 6, each address pointer is updated. Step 7 is equivalent to program description of the processing procedure of ITR circuit 11. Function phase_error( ) generates phase error filter_in using input data raw_data, and function filters calculates interpolation frequency error nco_in using the obtained phase error and internal variable filter_internal. Function nco( ) produces sample phase phase_offset using the attained error nco_internal and internal variable nco_internal. Function intrpolater( ) generates interpolated data using a sample phase indicated by phase_offset and input data. Thanks to control of address pointers above, even if the phase following operation is impossible in the ITR circuit, the data processing can be restarted beginning at a point of time when the phase following operation failed.

Figure 25:
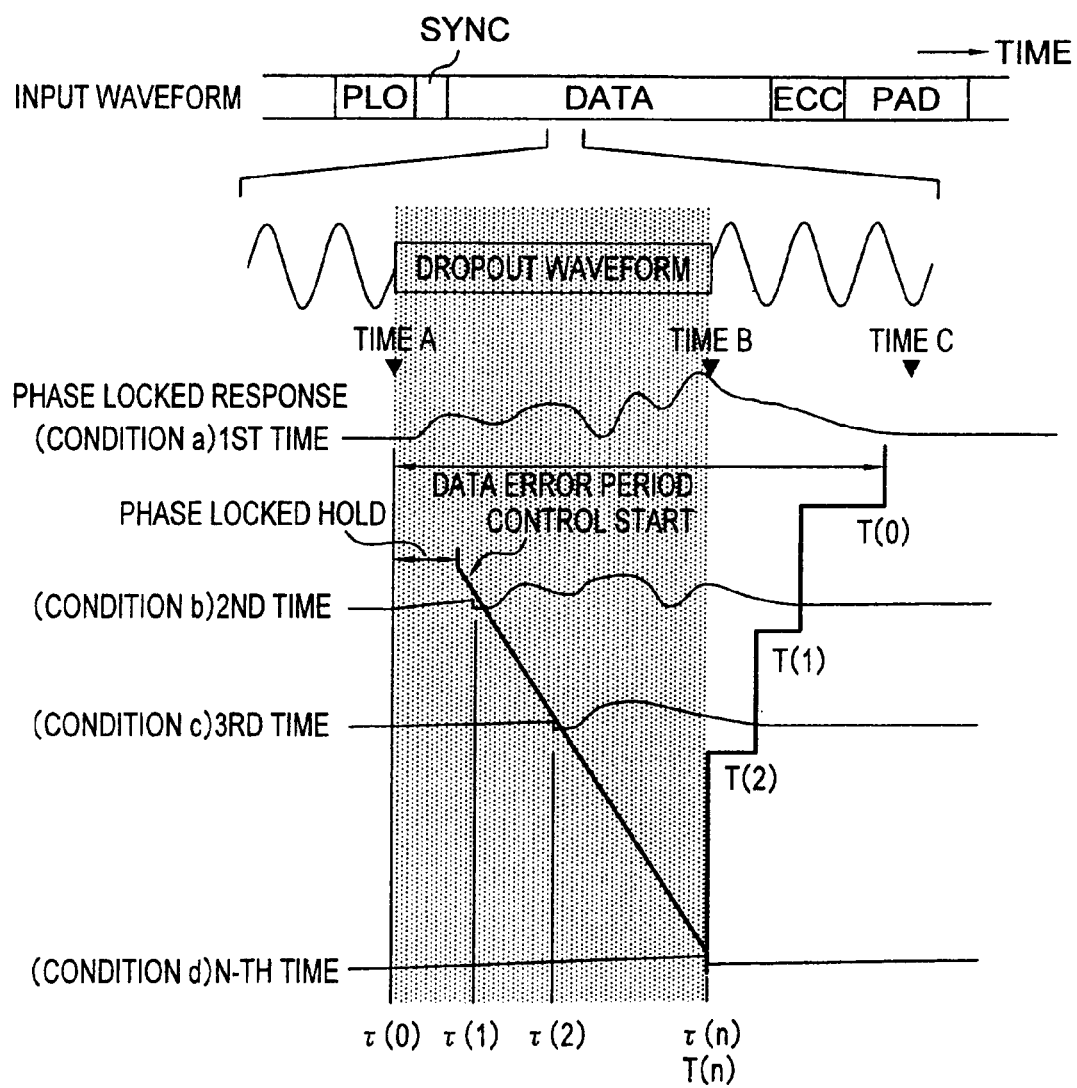
FIG. 25 is a diagram for explaining an example of operation of the signal processing circuit of FIG. 22.

Description will now be given of a concrete processing method in a case in which, for example, a waveform shown in FIG. 25 is supplied to the detecting circuit. The waveform partly includes defect in data due to dropout of media 54. Until time A as shown in condition (a), response for phase synchronization is stable. However, in a range from time A to time B, the response is unstable due to the defective waveform. After time B, the input waveform becomes normal and hence the response becomes stable at time C.

Reproduced data error occurs from time A to time B due to the defective waveform, and also from time B to time C due to unstable response of phase locking. Therefore, reproduced data error occurs until time T(0). When the data error is detected at time C, address pointers rd_a and wr_b are restored to variable N_delay related to .tau.(O). Moreover, variable N_area is set in association with a range from .tau.(O) to .tau.(1) to hold the phase locking. Phase locking is restarted at .tau.(1), since the defective waveform is also supplied to the phase locked loop circuit, the response is unstable. However, the data error length is reduced until time T(1), since the phase error of condition (b) at time B is less than that of condition (a). Condition (c) indicates a case in which the phase locking hold time is elongated from .tau.(1) to .tau.(2) to suppress phase variation at time B. While changing phase locking hold time N_area, data errors is checked. Finally, when the condition becomes as indicated by condition (d), the phase variation after time B is minimized since the phase locking is held from time A to time B. As a result, it is possible to achieve data reproduction with a stable phase locking.

Figure 26:
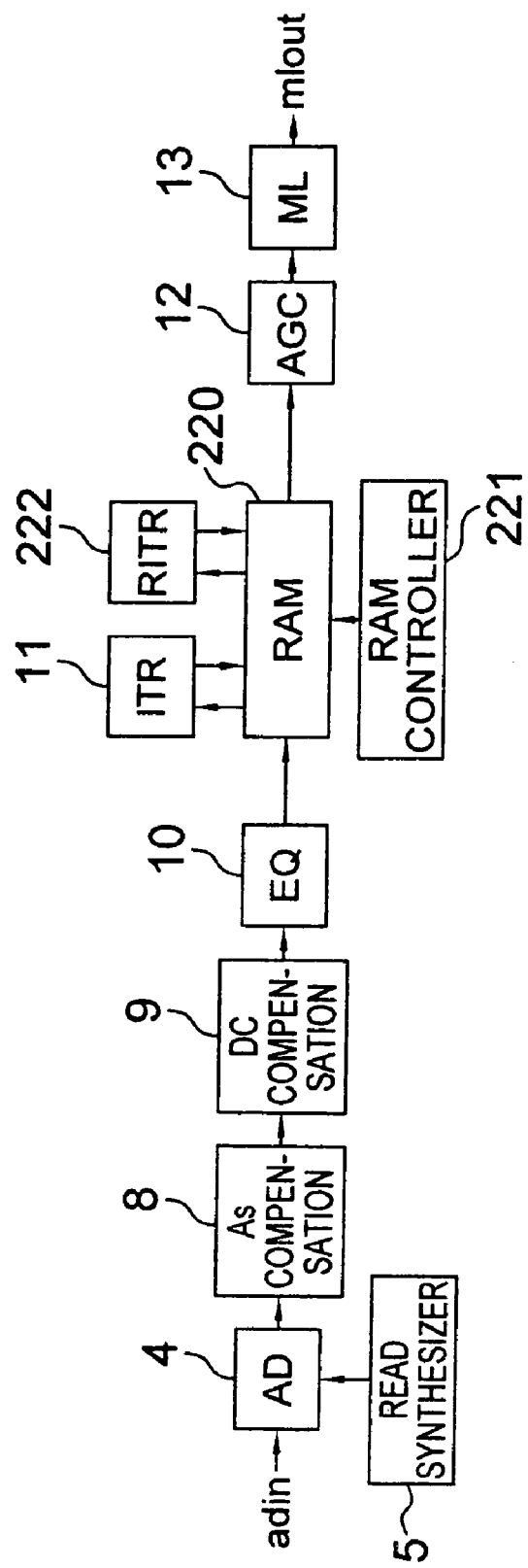
FIG. 26 is a block diagram for explaining an embodiment of a reproducing circuit using a RAM and a phase locked loop circuit in accordance with the present invention.

In this embodiment, the data is reproduced while changing the hold period of phase locking operation. However, using a particular phase locked loop circuit shown in FIG. 26, the data reproduction can be achieved more efficiently. FIG. 26 shows an embodiment of constitution for the processing and includes a reverse ITR (RITR) circuit 222. Using sampled data which is reverse in sequence to the input data to ITR circuit 11 and of which the sample time is reverse to that of the input data of ITR circuit 11, RITR circuit 222 generates interpolated data for the input data. The other components have the same functions as those of FIG. 22. Sampled data by AD circuit 4 is delivered to RAM 220 through As compensation circuit 8, DC compensation circuit 9, and equalize 10 as described above.

Figure 28:
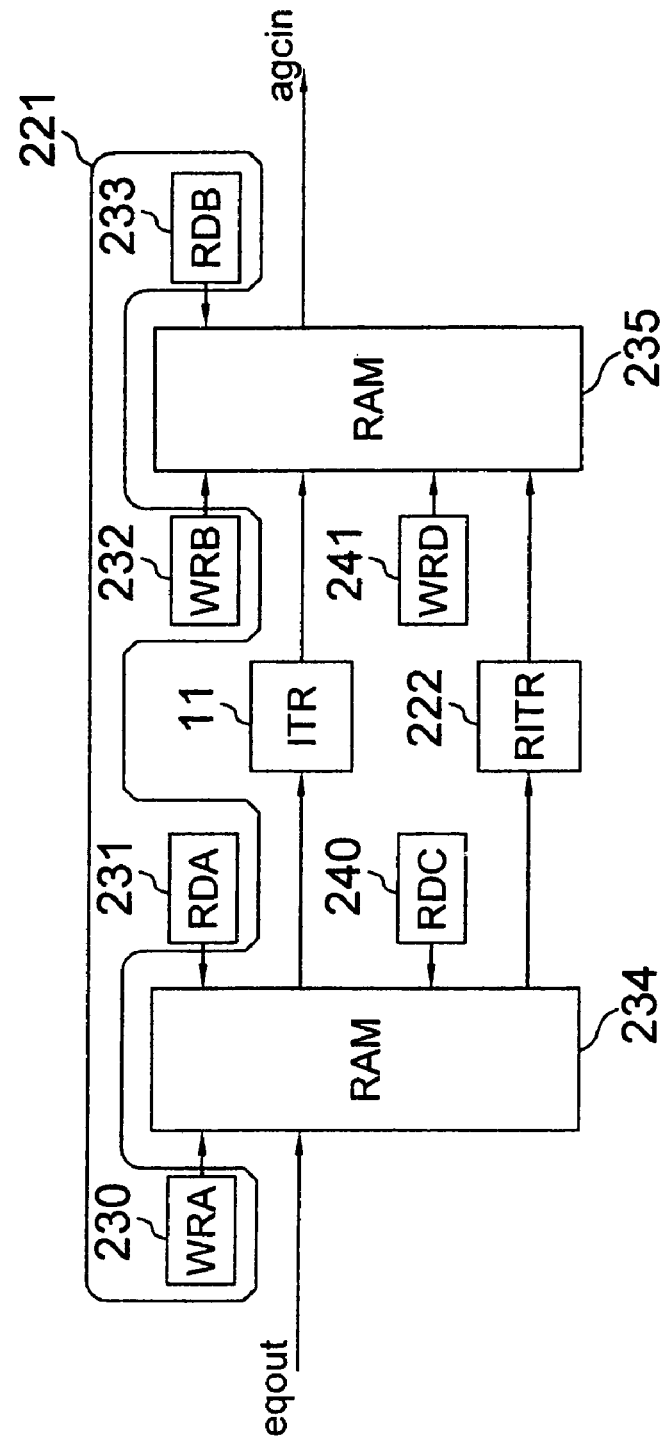
FIG. 28 is a block diagram for explaining an alternative example of the peripheral circuit configuration of the RAM in accordance with the present invention.

RAM 220 to store sampled data for ITR and RITR phase locking operation specifically includes, in addition to the configuration of FIG. 23, address generators 240 and 241 to control input and output data of RITR circuit 222 as shown in FIG. 28. Address generators 230 to 233 generate addresses to achieve a count increasing operation as described above, however, address generators 240 and 241 accomplish a count decreasing operation. Consequently, when input data of ITR circuit 11 denotes x(O), x(1), x(2), x(3), . . . , which are forward data sequence, input data of RITR circuit 222 are backward data sequence, namely . . . , x(3), x(2), x(1), x(O). When ITR circuit 11 also produces forward data sequence y(0), y(1), y(2), y(3), . . . , RITR circuit 222 produces interpolated data using a data reverse in time, namely, . . . , y(3), y(2), y(1), y(O). A concrete configuration of RITR circuit 222 will be described later. Interpolated data by ITR circuit 11 is stored into RAM 235 at an address indicated by address generator 232. Interpolated data from RITR 222 is stored, only if a data error is detected, into RAM 235 at an address denoted by address generator 241. As a result, the interpolated data from RITR 222 is stored in a backward direction over the interpolated data from ITR circuit 11 beforehand stored in response to an address pointer from address generator 232. Interpolated data finally remaining in RAM 235 is read in response to an indication from address generator 233 to be outputted as agcin data.

Figure 29:
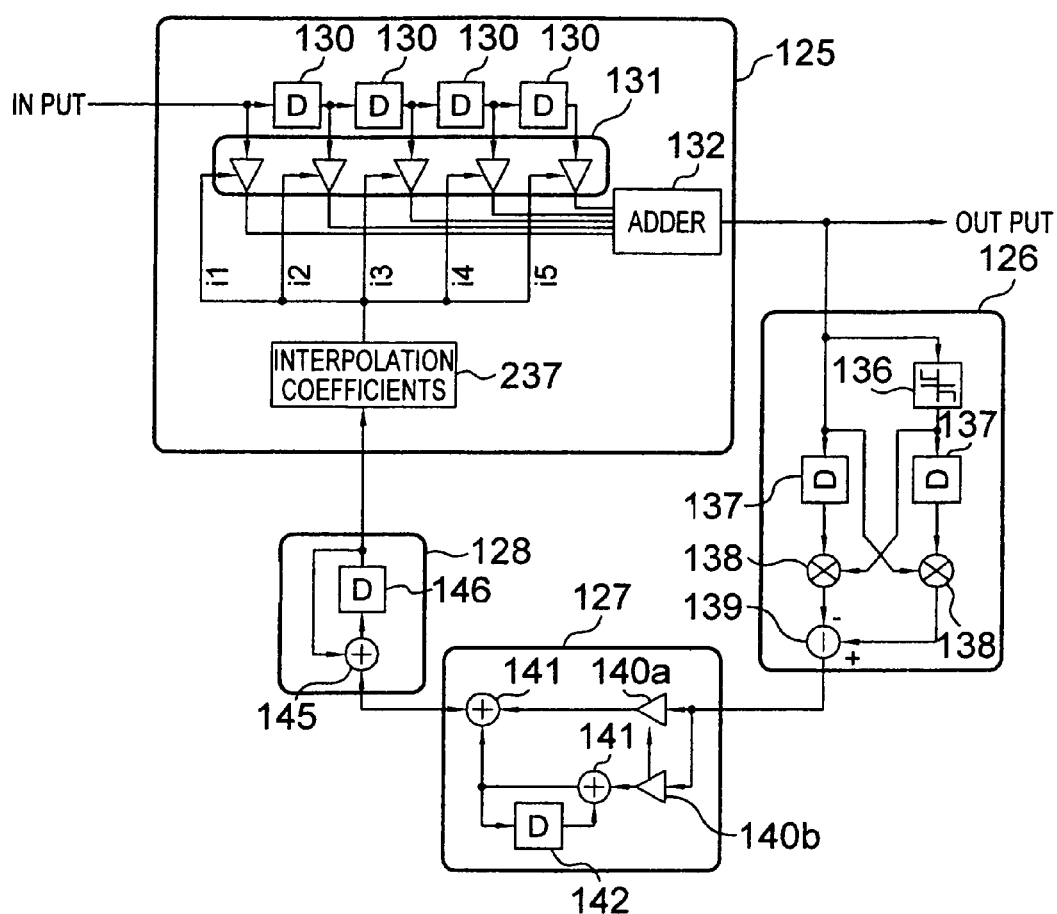
FIG. 29 is a block diagram for explaining an embodiment of a an reversed interpolated timing recovery (RITR) circuit in accordance with the present invention.

FIG. 29 shows a specific construction of RITR circuit 222. The circuit configuration is basically the same as that shown in FIG. 9. The difference resides in interpolation coefficient circuit 237 of which interpolation coefficients are reverse to those of an interpolation coefficient circuit 133 or 134. Since data supplied to RITR circuit 222 are sample data reversed in time as described above, interpolation coefficient circuit 237 is of axial symmetry with respect to time to interpolation coefficient circuit 133 shown in FIG. 9. Using interpolated data from filter 125, phase error detector 126 calculates a phase error. Since the output from filter 125 is reversed in time, detector 126 conducts a detecting operation reverse to the phase detection of FIG. 9. That is, a time lead is interpreted as a time lag. However, the sample phase attained through processing of circuit 127 and integrator 128 is also reversed in the phase direction, the overall phase control direction is kept unchanged. Using sample data reversed in time in the configuration above, interpolated data can be advantageously generated. In the description of the embodiment, the coefficient circuit 133 or 134 of FIG. 9 is replaced with interpolation coefficient circuit 237. However, since the circuit 133 or 134 configures a linearly symmetric filter and original coefficients' are linearly symmetric, the coefficients obtained by interpolation coefficient circuit 237 may be identical to coefficients 1 of circuit 133. As a result, RITR circuit 222 can also be implemented in the same circuit configuration as ITR circuit 11.

Figure 30:
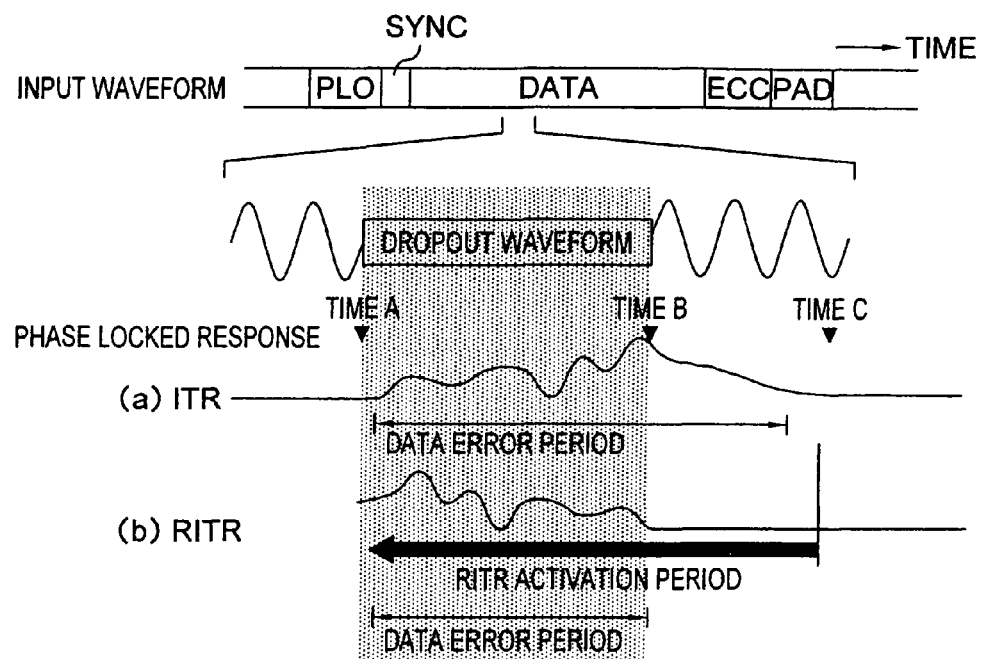
FIG. 30 is a diagram for explaining an example of operation of the RITR circuit.

Referring next to FIG. 30, description will be given of operation to reproduce data of one sector by RITR circuit 222. The input waveform of FIG. 25 is also used in this circuit. The phase locking response of ITR circuit 11 is unstable from time A to time C as indicated by FIG. 30(a) due to defective waveform. In this result, data error occurs during time A to time C. When termination of the data error is detected at time C, RITR circuit 222 calculates interpolated data from time C to time A using phase locking information at time C as denoted by condition FIG. 30(b). Interpolated data from RITR circuit 222 stores in RAM 235 the data up to time A associated with an unstable phase. Since the input waveform is free of defect from time C to time B, the response of RITR 222 is stable and produces appropriate data. However, the response becomes unstable from time B to time A due to defective waveform. Finally, the data produced by ITR circuit 11 respectively before time A and after time C, and the data generated by RITR circuit 222 from time A to time C are stored in RAM 235. The data generated by ITR 11 and RITR 222 is outputted from RAM 235 pointed at address generator 233 as agcin data. Using interpolated data for ITR 11 and RITR 222, the interpolated data of RITR 222 from time B to time C has been appropriately produced. Therefore, the data error period associated with the unstable phase locking state is minimized to a range from time A to time B. Thanks to the phase locking circuit using RITR 222, the reliability for data detecting is improved though the complex repetitious processing described above distributes.

Description has been given of a situation in which the phase locking response becomes unstable at time C in the embodiment. However, there may occur a case in which the phase locking operation is disabled due to a defective waveform. In this difficulty, the data decoding performance can be improved using a sector format shown in FIG. 31. In an ordinary data reproduction, the format is processed in an order of PLO, SYNC1, Data, and ECC fields as forward direction. To achieve data reproduction beginning at an end point of the sector, SYNC2 and POST fields are additionally provided after ECC field. At a data error in a sector, phase locking operation of RITR circuit 222 achieves within the POST field, which is sufficient for acquisition phase locking equal to that of PLO field. In the reproduction in the backward direction, data is read from POST, SYNC2, ECC, Data, SYNC1, and PLO field in this order, and RITR circuit 222 accordingly generates interpolated data for all of the fields in the backward direction. The data stored in RAM 235 is outputted therefrom beginning at the first field of the sector to be processed in the subsequent circuits.

Figure 32:
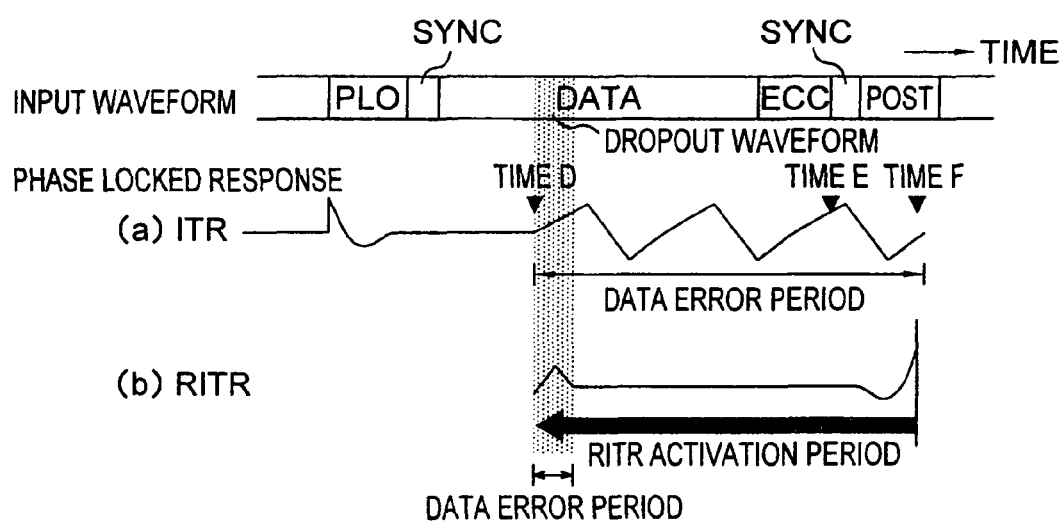
FIG. 32 is a diagram for explaining an example of another operation of the RITR circuit.

FIG. 32 specifically shows the data processing method. The phase locking response of ITR 11 in the data detecting operation beginning at the first field of the sector is unstable due to a defective waveform beginning at time D. After this point, the phase locking of ITR 11 is unstable and the operation is disabled. When a data error is detected at time F during the detecting of data, RITR 222 starts to generate interpolated data using sample data stored in RAM 234. RITR 222 first conducts the phase locking in POST field and stores interpolated data up to time D passing through time E in RAM 234. The phase locking response of RITR 222 becomes unstable again at time D due to defective waveform. RITR 222 interrupts the writing of interpolated data to RAM 235. Therefore, interpolated data is outputted from RAM 235 pointed by address generator 233 as a result of agcin data. Thanks to the processing procedure above, even when the phase locking operation is interrupted due to a malfunction caused by some reasons and becomes disabled, the retry operation can be accomplished without reading again the reproducing signal from media 54.

In the description of the embodiment, the length of POST field is equal to or less than or equivalent to that of PLO area. However, even when the POST area has a length of one byte or zero, it is possible to conduct similar processing. Specifically, as described in conjunction with the configuration to modify the initial value of ITR circuit 11 for the zero phase start, the configuration of zero phase start can be applied to RITR circuit 222. When the phase locking operation is carried out while modifying the initial value of the sample phase of RITR circuit 222, for example, that of delay circuit 146, RITR circuit 222 can also conduct the zero phase start. Resultantly, the POST area for the phase locking operation can be dispensed with in accordance with the embodiment.

Figure 31:
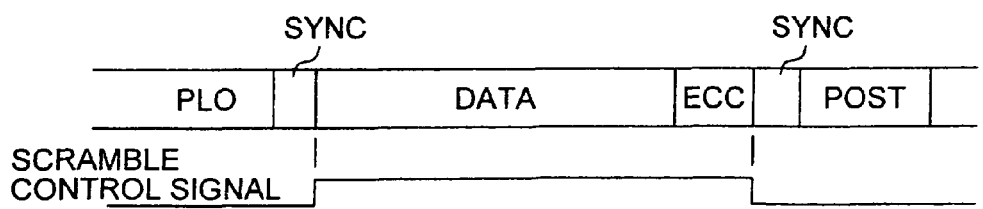
FIG. 31 is a diagram for explaining a data format of operation of the RITR circuit.

Scrambler 62 has not been described in the embodiment. However, scrambler 62 in a general operation sets random data to Data, ECC, and POST fields after the SYNC1 in the data recording operation. In the data format of the embodiment as shown in FIG. 31, POST and PLO fields are required to be loaded with the same data, and SYNC1 and SYNC2 are so on. It is consequently necessary for scrambler 62 to assume random data in Data and ECC fields excepting POST and SYNC field. In consequence, scrambler 62 is controlled by a scramble control signal shown in FIG. 31 to discriminate ECC field from SYNC2 and POST fields. Such a control signal is essential in controller 51 to control ECC circuit 57 and RAM 56 and hence can be easily supplied to recorder circuit 58.

Figure 27:
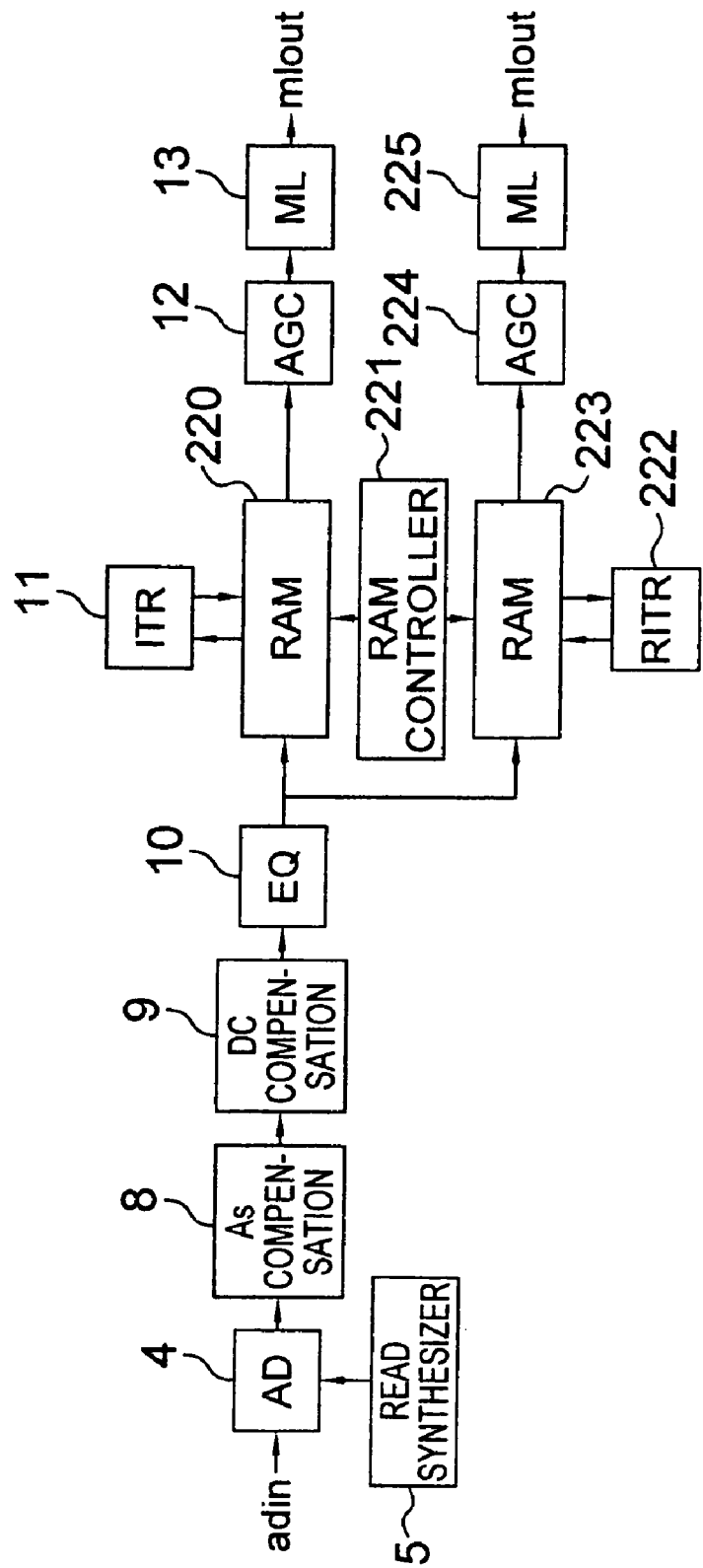
FIG. 27 is a block diagram for explaining an alternative embodiment of a reproducing circuit using a RAM and a phase locked loop circuit in accordance with the present invention.

In addition to the embodiments above, there can be achieved similar processing by a circuit configuration shown in FIG. 27. For easy understanding, there are indicated an RAM 223 same as RAM 220, an AGC circuit 224 and an ML detector circuit 225 respectively having the same functions as AGC circuit 12 and Ml detector circuit 13. Sampled data from AD circuit 4 is processed by the signal processing section ranging from As compensation circuit 8 to equalizer 10. The output from equalizer 10 is fed to RAM 220 and RAM 223. Using interpolated data processed by RAM 220, ITR circuit 11, and RAM controller 221 in a direction from the start point of sector to the end point as forward direction. Thereof, AGC circuit 12 and ML detector circuit 13 achieves a data decoding operation. RAM 223 and RAM controller 221 once store the data of sector from the first data to the last data, and then RITR circuit 222 generates interpolated data in the backward direction, i.e., from the last data to the first data. The resultant data is outputted by RAM controller 221 and RAM 223 in a direction from the first data to the last data and is then detected by AGC circuit 224 and ML detector circuit 225. Detecting data from ML detector circuits 13 and 225 is respectively equivalent to outputs from ML detector circuits 13 and 35 shown in FIG. 4. Therefore, by supplying the data to sync detectors 14 and 36 of FIG. 4, there can be configures a detecting circuit.

Figure 33:
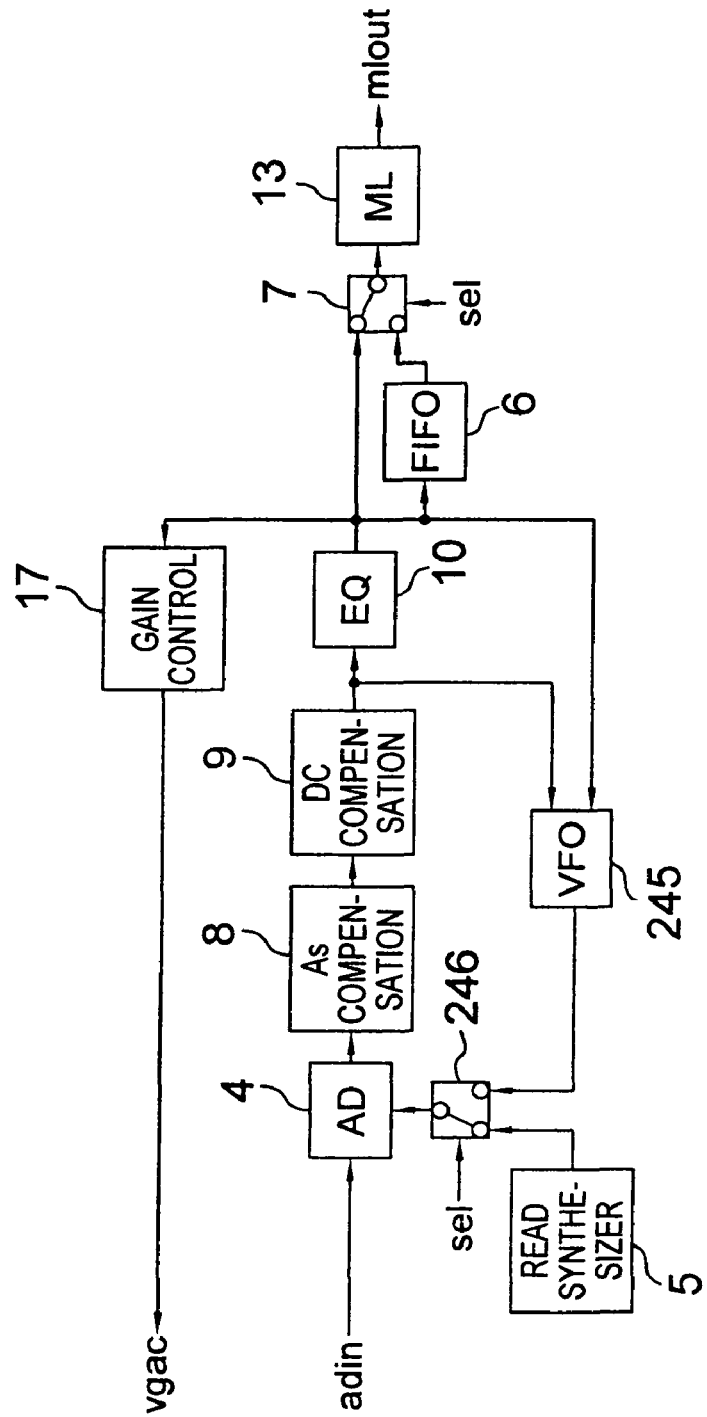
FIG. 33 is a block diagram for explaining an alternative constitutional example of the reproducing circuit in accordance with the present invention.

FIG. 33 shows an alternative embodiment of the detecting circuit including a memory. The embodiment includes a phase locked loop circuit (VFO) 245 and a sampling clock selector 246. Specific constitution of the embodiment will be avoided. The read gate signal is asserted at head read operation using reproducing signals on media 54 and at internal retry read operation using sampled data in FIFO circuit 6. Moreover, sel signal determines the sampling clock signal of AD circuit 4, for example, "0" only in the head read operation and "1" in another operation. The clock signal from VFO 245 is employed as the sampling clock signal of AD circuit 4 when sel="0" (i.e., in the head read operation). After the head read operation is completed, the internal retry operation is started. Signal sel is set to "1", and the clock signal from read synthesizer 5 is utilized as the sampling clock signal of AD circuit 4.

Next, description will be given of operation of each constituent component for the head read operation. In response to a sampling clock signal from VFO 245, AD circuit 4 samples analog signals obtained from the reproducing signals above. VFO 245 conducts a phase locking operation using data from the outputs of DC compensation circuit 9 and equalizer 10 generated by processing sampled data from AD circuit, As compensation circuit 8. In a phase acquisition operation, VFO 245 conducts using output data from DC compensation circuit 9 in PLO field at the first position of the sector. In a phase following operation after the phase acquisition operation, VFO 245 conducts using output data from equalizer 10. The output of equalizer 10 is coupled to gain control circuit 19, selector 7, and FIFO circuit 6. Gain control circuit 19 controls VGA circuit 2 to keep the signal amplitude within a fixed range. FIFO 6 sequentially stores the data from equalizer 10 beginning at the start point of the sector. Selector 7 feeds the output from equalize 10 to ML detector circuit 13 since sel signal is "0". ML detector circuit 13 detects the output from equalizer 10 or FIFO 6. Therefore, output signal mlout from ML detector circuit 13 is processed in sync detector 14 and subsequent circuits.

The processing is similar to that described above and will not be redundantly described. After the head read operation is finished, if ECC circuit 57 detects a data error in a sector, sel signal is set to "1" and an internal retry read operation is carried out. That is, a data detecting operation is conducted in accordance with stored data in FIFO 6. Namely, the sampled data from AD circuit 4 is not used and hence the sampling clock signal is not required for AD circuit 4. However, in general, As compensation circuit 8 and the subsequent circuit blocks operate in response to the sampling clock signal of AD circuit 4. In this situation, the embodiment is configured to achieve changeover for the sampling clock signal. In the internal retry read operation, FIFO 6 and ML detector circuit 13 operate in response to the clock signal from read synthesizer 5. Data from FIFO 6 is detected beginning at the first position of the sector by ML detector circuit 13 while changing the characteristic thereof, and resultant data is processed by sync detector 14 and subsequent circuits. If the error is corrected as a result of the operation, the data reproduction can be carried out without any latency.

Figure 34:
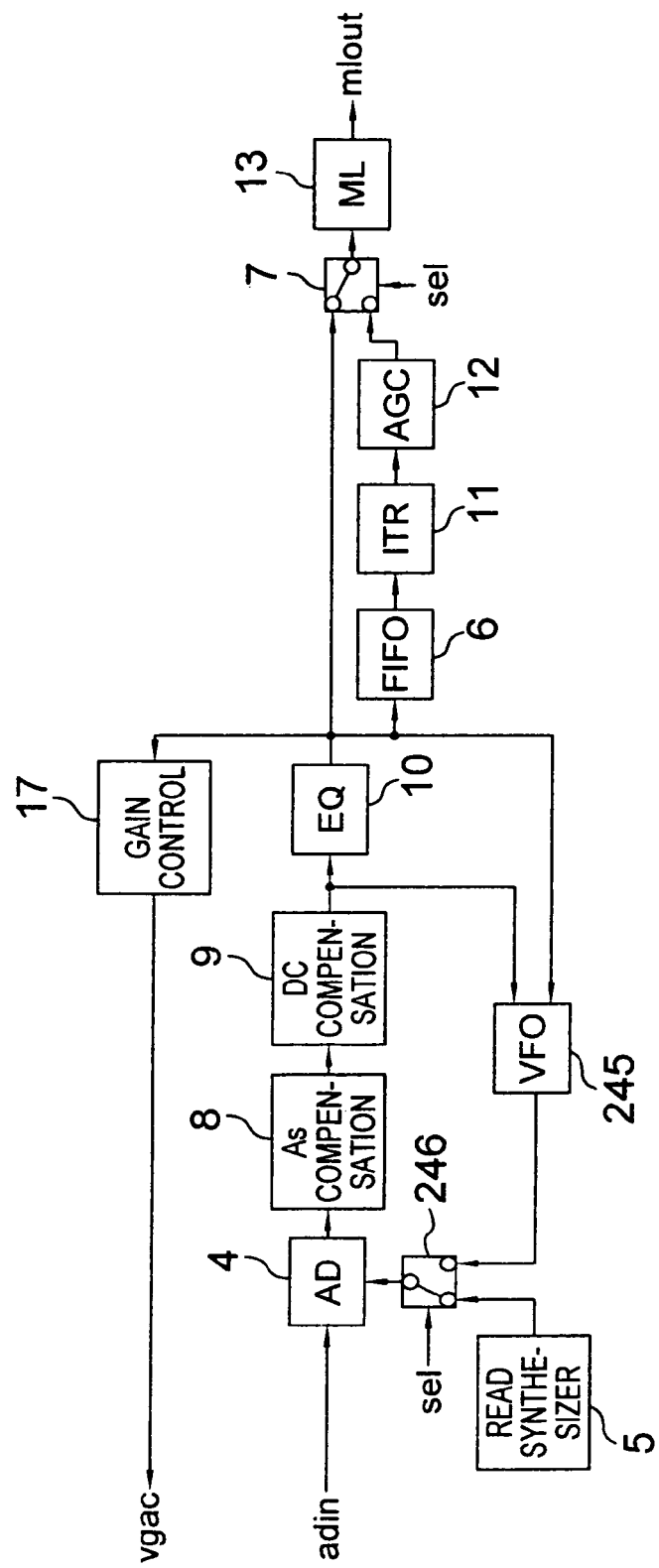
FIG. 34 is a block diagram for explaining another constitutional example of the reproducing circuit in accordance with the present invention.

In this embodiment, when the phase locking response of VFO 245 is stable for all sectors, possibility of data error lowers even the data demodulation is accomplished using stored data from FIFO 6. However, if VFO 245 is unstable and becomes disabled, the possibility of data error is considerably increased. Referring FIG. 34, description will now be given of an embodiment in which a data error can be recovered through a retry operation even if VFO 245 becomes disabled. The same constituent components as those described above are assigned with the same reference numerals. The head read operation is controlled such that sel signal is set to "0", the clock signal from VFO 245 is used as the sampling clock signal of AD circuit 4, and the output from equalizer 10 is delivered to ML detector circuit 13. In the circuit blocks, the data detecting operation is achieved in almost the same manner as those described above.

After completion of the head read operation, if ECC circuit 57 detects, for example, a data error in a sector because VFO 245 cannot conduct the phase locking operation, sel signal is set to "1". And the internal retry read operation is conducted. Stored data in FIFO 6 includes sampled data for which the phase locking failed for the following reasons. ML detector circuit 13 cannot appropriately achieve the data detection because the phase locking has not been established with respect to the input data. Namely, data has been missing. ITR circuit 11 and AGC circuit 12 estimates interpolated data, which is stable in phase and amplitude using stored data in FIFO 6. ML detector circuit 13 again detects interpolated data to be processed through the subsequent circuits. If the error is corrected as a result, the data reproduction can be carried out without any latency.

Figure 35:
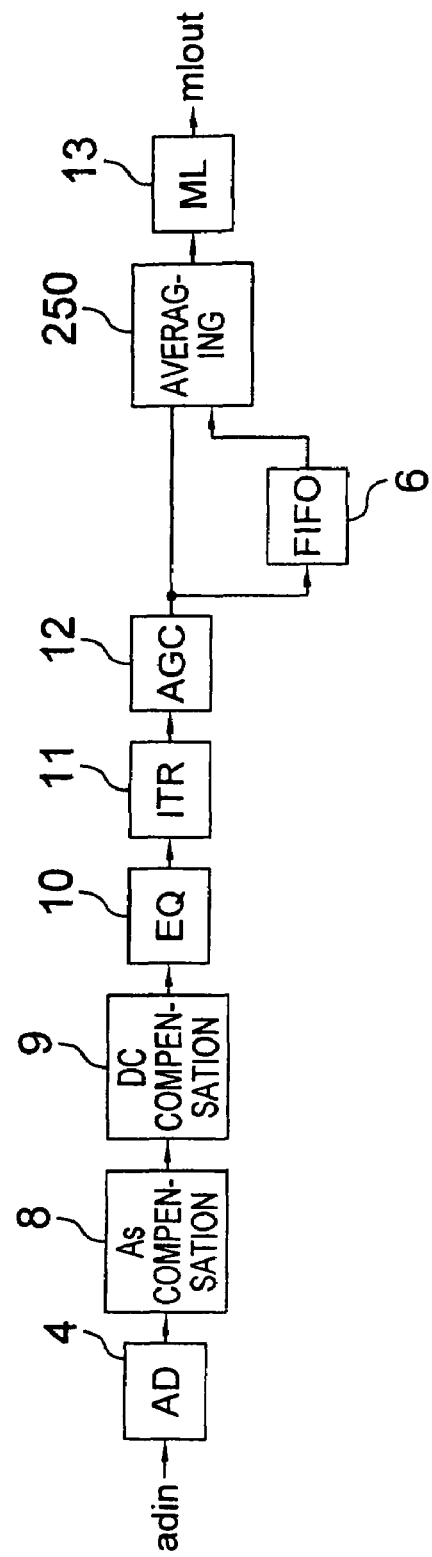
FIG. 35 is a block diagram for explaining a constitutional example of the reproducing circuit to improve the signal-to-noise ratio in accordance with the present invention.
Figure 36:
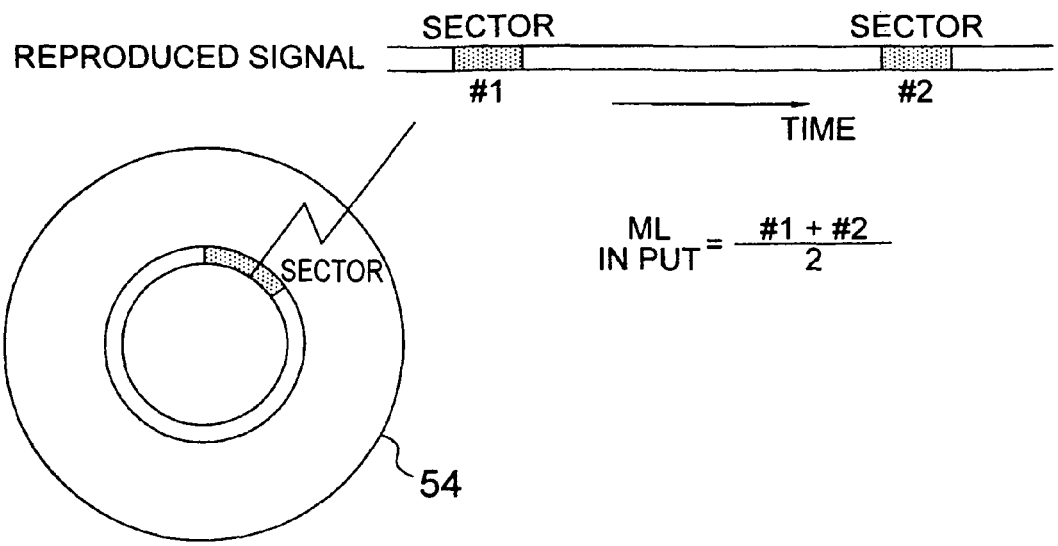
FIG. 36 is a schematic diagram for explaining a concept of operation of the reproducing circuit of FIG. 35.

Referring next to FIG. 35, description will be given of an embodiment of a detecting circuit capable of reproducing signals having a lower signal-to-noise ratio. The embodiment includes an average circuit 250. The same circuits as those described above are assigned with the same reference numerals. Sampled data from the pertinent sector is previously stored in FIFO 6. Specifically, as can be seen from FIG. 36, signal of the pertinent sector is obtained at each time, because the media 54 has rotated constantly. A sector signal recorded on a track is stored as sampled data in FIFO 6 through AD circuit 4 to AGC circuit 12. Next, when media 54 makes one turn and the signal of the same sector are reproduced, average circuit 250 calculates an average of current data coming from AGC circuit 12 and the sampled data of the previous read operation in FIFO 6. The average operation is started after sync byte data, therefore, the operation is conducted as a synchronized addition for the same sector. Namely, without changing the signal amplitude, only noise superimposed onto the signal is attenuated by a square root of ½. As a result, the signal-to-noise ratio of the sampled data supplied to ML detector circuit 13 is improved only 3 dB. That is, it is possible to reproduce signals having a lower signal-to-noise ratio.

Figure 37:
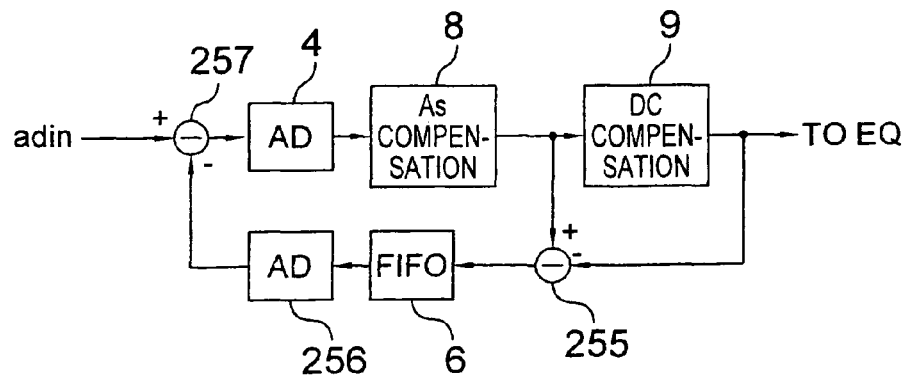
FIG. 37 is a block diagram for explaining an embodiment of a thermal asperity eliminating circuit in accordance with the present invention.
Figure 38:
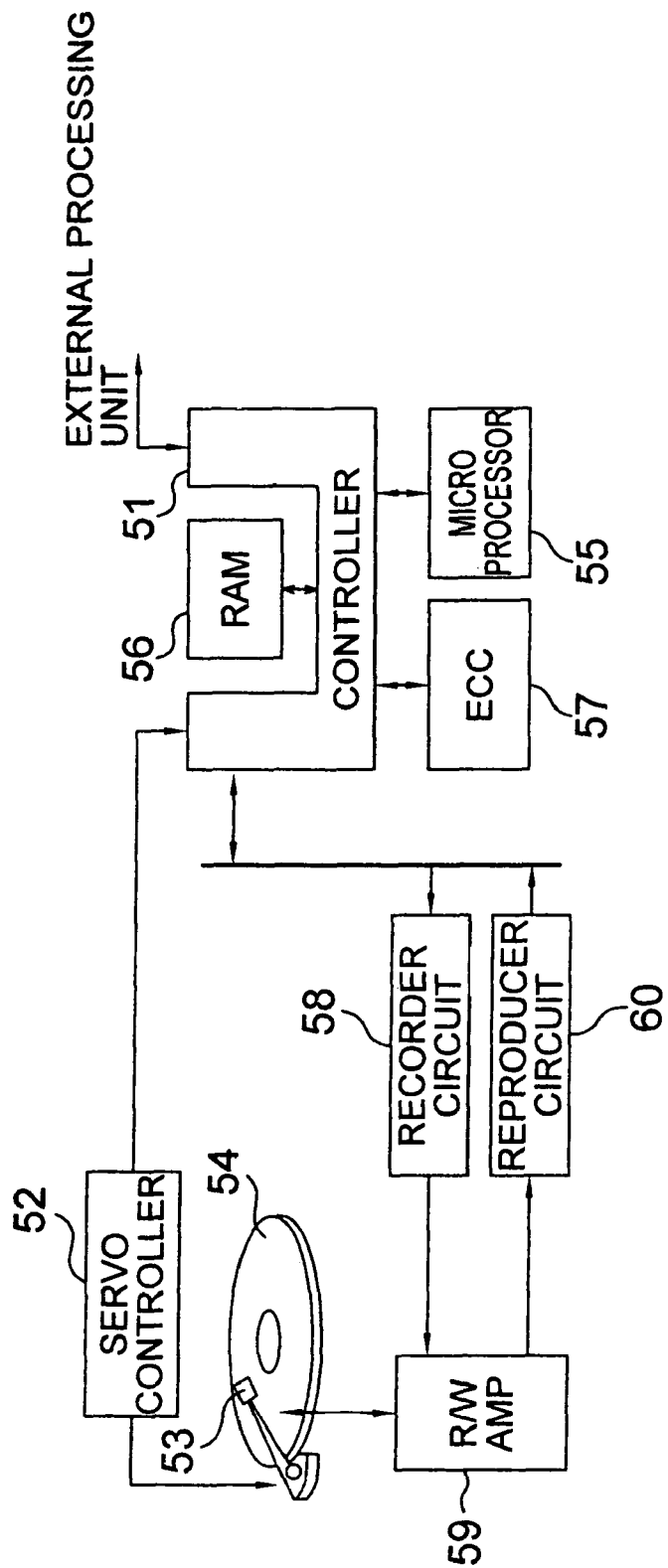
FIG. 38 is a block diagram for explaining a constitutional example of a general magnetic recording and reproducing apparatus.

Referring now to FIG. 37, description will be given of an embodiment of a TA eliminator circuit. The TA eliminating operation is carried out in association with the two times of data read operation above also in this embodiment. The embodiment includes subtractors 255 and 257 and a DA converter 256. The same components as those described above are assigned with the same reference numerals. Subtractor 255 subtracts the output of DC compensation circuit 9 from that of As compensation circuit 8 to produce a DC component of the output from As compensation circuit 8, for example, that is a TA baseline data. If thermal asperity is detected in the first read operation to the sector, TA baseline data is stored in FIFO 6 via subtractor 255. In next read operation to the sector, the TA baseline data stored in FIFO 6 is converted into analog signal by DA converter 256. Thereafter, subtractor 257 conducts a subtraction for the analog signals. In general, thermal asperity occurs at a fixed position. Consequently, by achieving a subtraction between the output from subtractor 257 and the TA waveform attained by the previous read operation, there is produced a waveform free of baseline variation due to thermal asperity. The waveform is fed to AD circuit 4. Resultantly, in the next read operation to the sector, the baseline variation due to TA is removed and hence the data decoding error due to a malfunction in equalizer 10 and subsequent signal processing circuits is prevented.

Figure 39:
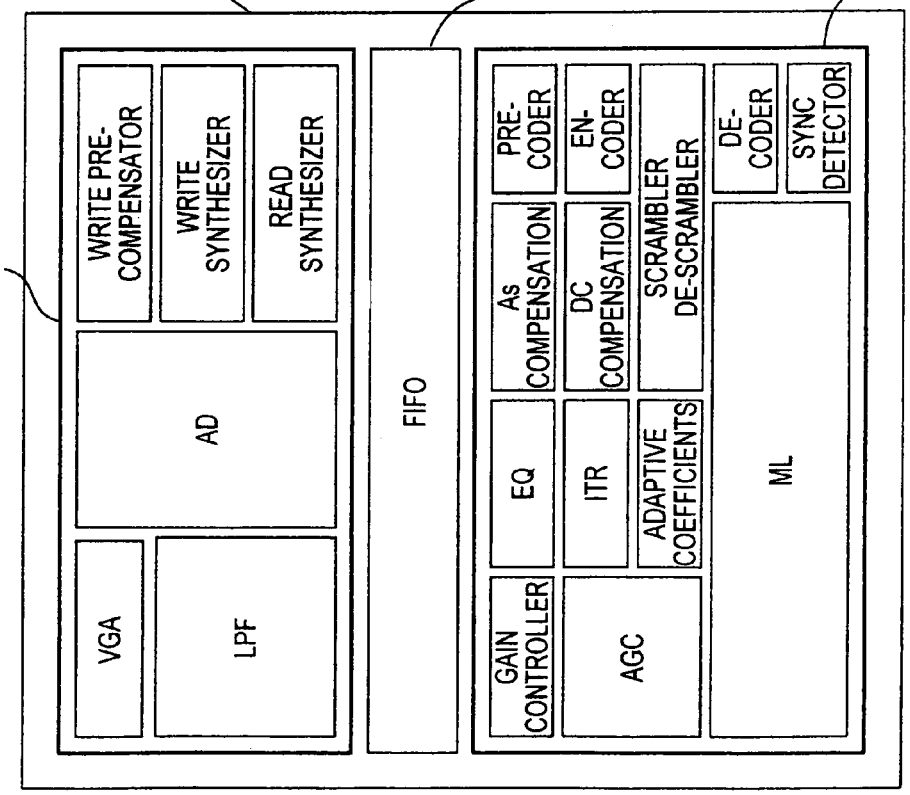
FIG. 39 is a block diagram for explaining a constitutional example of a read channel LSI of present invention.

FIG. 39 shows an example chip layout of a read channel LSI that includes a recorder circuit 58 and a reproducer circuit 60 of present invention within one semiconductor chip. The feature of the layout is that there is a memory circuit domain as a main element of the FIFO. The memory circuit domain can be identified with its size in perceived extent by a microscopic observation. Prior chips do not have such a clearly distinct FIFO domain because they have only analog circuit domains those are arranged with elements by a manual wiring, digital circuit domains those are automatically arranged by a computer, and combination comains of both circuits. Therefore, it is easy for observers to identify the memory circuit domain with its size in perceived extent with a microscopic photography.

The memory circuit domain consisting the FIFO of present invention is arranged digestedly for a compact layout, comparing with a digital circuit domain that is arranged at random. Further the memory circuit domain of the present invention has special I/O portions because the I/O bit numbers or the I/O capacities have special use for this invention. The I/O features of the memory circuit domain help its identification.

A size of the memory circuit domain can include 4700 samples (one sample can hold one bit information in itself) because a sector, which is a fundamental element for record/reproduce operations in disk drives, has around 550 bites information that is converted to around 4700 samples through a 16/17 conversion. Because an AD circuit in disk drives inputs an analog signal and outputs 6 bits digital signals in general, input numbers of a memory that is coupled to the AD circuit becomes integer-times as large as 6. On the other hand, an I/O bits number of the memory is decided by a sampling frequency in the AD circuit and a limit velocity of the memory operation. If a data transfer velocity is around 400 Mbits per second, the I/O bits of the memory generally has 4 parallel 6 bits line=24 bits-lines. The memory is needed to have so fast I/O that it is generally a static type in configuration.

Figure 40:
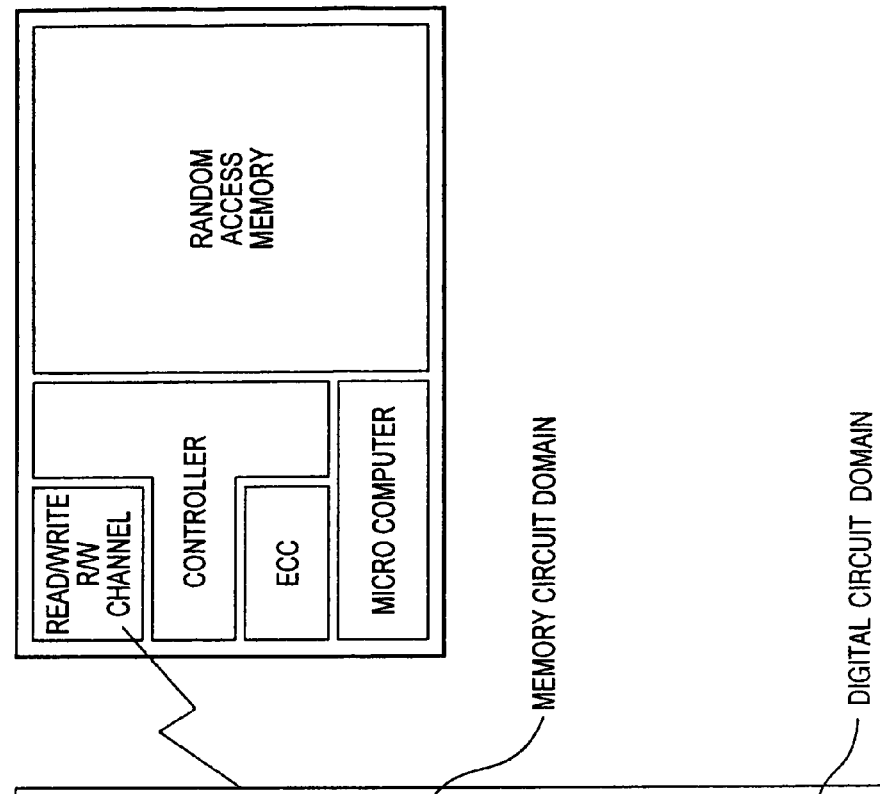
FIG. 40 is a block diagram for explaining a constitutional example of a data record/reproduce LSI of present invention.

FIG. 40 shows an example chip layout of a data record/reproduce LSI that includes within one semiconductor chip, a controller 51, a RAM 56, an ECC generating and correcting circuit 57, and a microprocessor 55 additionally to the recorder circuit 58 and the reproducer circuit 60. Some portions of the controller 51, the RAM 56, the ECC generating and correcting circuit 57, and the microprocessor 55 are automatically layouted because they are randomly arranged.

The RAM 56 is same kind memory to the FIFO 6, however, there is a difference in their capacities and configurations. FIFO 6 is a high speed static memory with around several kilo bites. RAM 56 is a dynamic memory with around several mega bites. It is easy to identify the FIFO 6 of the present invention from RAM 56 with a microscopic photography showing a big scale data record/reproduce LSI.

Summarizing the description of the present specification in conjunction with the accompanying drawing, there can be provided, for example, the signal processing apparatuses and data recording and reproducing apparatuses as follows.

1. A signal processing apparatus including a storage to store reproducing signal, a selector to make changeover between reproducing signal and signal outputted from the storage, a signal processing unit to process signal outputted from the selector, and a detector to detect an output data from the signal processing unit.

2. A signal processing apparatus of article 1 in which the signal processing unit has a programmable input/output characteristic.

3. A signal processing apparatus of article 1 further including an error analyzer to analyze causes of errors in the signal processing unit or the detector. The selector conducts its operation according to a selecting condition determined in accordance with a result of analysis by the analyzer.

4. A signal processing apparatus of article 1 including procedure 1 to process the reproducing signal by the signal processing unit and the detector, and procedure 2 to repeatedly process the output from the storage at least once by the signal processing unit and the detector. Procedures 1 and 2 are executed in this order.

5. A signal processing apparatus of article 1 including procedure 1 to process the reproducing signal by the signal processing unit and the detector, and procedure 2 to repeatedly process part of the output from the storage at least once by the signal processing unit and the detector. Procedures 1 and 2 are executed in this order.

6. A signal processing apparatus of article 1 in which part of the reproducing signal is stored in the storage. That is provided procedure 1 to process the reproducing signal by the signal processing unit and the detector, and procedure 2 to repeatedly process the signals stored in the storage at least once by the signal processing unit and the detector. Procedures 1 and 2 are executed in this order.

7. A data recording and reproducing apparatus in which a signal processing apparatus of article 4, 5, or 6 conducts a data recovery to detect data in an area in which reproducing signals include abnormality.

8. A data recording and reproducing apparatus in which a signal processing apparatus of article 4, 5, or 6 conducts defect registration to find out in an area in which reproducing signals include abnormality.

9. A signal processing apparatus of article 1 in which the storage includes first signal processing unit to convert an N-bit input into an M-bit output, data storage unit to store an M-bit output data from the first signal processing unit, second signal processing unit to convert an M-bit output signal from the data storage into an N-bit signal. Where M is less than N.

10. A data recording and reproducing apparatus including a media to store data, a recorder to record data on the media, and a reproducer to reproduce data from the media, wherein the reproducer includes signal processing unit of article 1.

11. A signal processing apparatus of article 10 in which the reproducer is mounted on a circuit component.

12. A signal processing apparatus including a storage to store reproducing signal from a media, a signal processing unit to process signal recorded in the storage, and a detector to detect an output from the ML detector circuit.

13. A signal processing apparatus including a storage to record reproducing signal from a media, an arithmetic unit to conducts an operation between the reproducing signal and signal outputted from the arithmetic unit, and a detector to detect an output from the signal processing unit.

14. A signal processing apparatus including a decoder unit to decode N-bit data into. M-bit data, an encoder unit to encode M-bit data into N-bit, and a comparator to compare the N-bit input data for the decoder and the N-bit output data for the encoder thereby detect a conversion error.

15. A data format including a first phase locking field to conduct bit synchronization in a processing unit, a first byte synchronizing field to conduct byte synchronization, a data field to record data, a data protection field to detect and correct a data error in the data field, a second byte field to conduct byte synchronization, and a second phase locking field to conduct bit synchronization.

16. A data recording and reproducing apparatus using the data format of article 15 including a first data processing unit, and a second data processing unit. The first data processing unit conducts the first phase locking field, the first byte synchronization field, recorded data, and data protection field. The second data processing unit conducts the second phase locking field, the second byte synchronization field, recorded data, and data protection field.

17. A data recording and reproducing apparatus having a scrambling unit which scrambles only recorded data field and data protection field, except a phase locking field, a byte synchronizing field.

18. A signal processing apparatus including a first time axis converter to convert a sample input sequence $X(n)$ into sampled $X(-n)$, a synchronized sample converter to produce a sample output sequence $Y(-n)$ having a predetermined phase using an output $X(-n)$ from the first time axis converter, and a second time axis converter to convert the output sequence $Y(-n)$ from the synchronized sample converter into $Y(n)$, where time n is represented as $0, 1, 2, 3, \ldots, N$.

19. A signal processing apparatus including; an amplitude controller to control single amplitude within a fixed range, a filter to eliminate the signal bandwidth, a sampling unit to sample signal from the filter, a clock generator to generate clock signal for the sampling unit, a compensation unit to remove distortion of signal outputted from the sampling unit, a detector to detect data outputted from the compensation unit, a storage to store signal outputted from either one of the sampling unit and the compensation unit, and a sample data generator to generate sample data with different phases using signal outputted from the storage. Using part or entire of the signal stored in the storage, the sample data generator generates sample data. The detector detects the sample data thus generated.

20. A signal processing apparatus of article 19, in which the sample data is modified by initial values of the sample data generator. The initial values modified at least once to be detected by the detector.

21. A signal processing apparatus of article 19 including a first time axis converter to convert the sample data input sequence $X(n)$ into $X(-n)$, a synchronized sample converter to produce a sample output sequence $Y(-n)$ having a predetermined phase using an output from the first time axis converter, and a second time axis converter to convert the output sequence $Y(-n)$ from the synchronized sample converter into $Y(n)$. When time n is represented as $0, 1, 2, 3, \ldots, N$. The sample data is detected by the decoder.

22. A data recording and reproducing apparatus including a media to record data in a data storage area subdivided in a plurality of partitions, a recorder to record data into the data storage area on the media, a reproducer to reproduce data from the media. The reproducer achieves two or more times of reproducing operation of a partition, while reproducing data of the partition.

In the signal processing circuit operating with sample data stored on a storing media and the magnetic recording and reproducing apparatus utilizing the same in accordance with the present invention, the recovery time to restore a data error due to dropout or defect of the media can be minimized. Under a specific recovery condition, it is compared with conventional apparatus as following condition; the media rotation speed is 6000 rpm which spend 10 milliseconds in each rotation, the retry operation count is ten, and the processing time per sector is 250 microseconds. The recovery of the present invention can be completed in about 2.5 milliseconds (10 times of 250 microseconds). In conventional technology, it takes about 100 ms (10 times of 10 milliseconds). The recovery time is therefore considerably reduced in accordance with the present invention. Similarly, the present invention is applicable to a case in which the processing is repeatedly conducted using reproduction signal from the media.

The present invention also can be applied to, for example, the optimization of parameters of signal processing circuits and the registration of defective positions to the magnetic recording and reproducing apparatus so as to reduce the respective processing time.

In accordance with the present invention, it is possible to minimize the data error length like a burst taking place due to defect or the failure of the recording media. In general, variation in the phase locking response due to the defect of the media causes a burst error exceeding an associated defective media length. In accordance with the present invention, by correcting such variation in the phase locking response after the defect of the media, the burst error exceeding the associated defective media length can be advantageously suppressed.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A data demodulating apparatus, wherein a data sector stores a part of user data or the whole of the user data, and said data sector at least comprises a bit sync region for carrying out bit synchronization, a symbol sync region for carrying out symbol synchronization, a coded user data region for recording a part of said user data or the whole of the user data by coding, and an error correction detection region for error correction and error detection of the recorded data, said data demodulating apparatus comprising:
   phase synchronizing means for carrying out bit synchronization in said bit synch region;
   symbol synchronizing means for carrying out symbol synchronization in said symbol sync region; and
   storage means for storing a part of said bit synch region, or the whole of the region, a part of said symbol sync region, or the whole region, and data of the coded user data region, and data of said error correction detection region,
   wherein, in accordance with data stored in said storage means, by utilizing said phase synchronizing means and said symbol synchronizing means, demodulation of user data or error correction detection is carried out.

2. A data demodulating apparatus, wherein a data sector records a part of user data, or the whole of the user data, and said data sector at least comprises a bit sync region for carrying out bit synchronization, a first symbol sync region for carrying out symbol synchronization, a coded user data region for recording a part of said user data or the whole of the user data by coding, and an error correction detection region for error correction and error detection of the recorded data, a second bit sync region and a second symbol sync region, said data demodulating apparatus comprising:
   first data demodulating means for carrying out demodulation of said user data region and error correction/detection by using first phase synchronizing means for carrying out bit synchronization in said first bit sync region and first symbol synchronization means for carrying out symbol synchronization in said first symbol sync region; and
   a second data demodulating means for carrying out demodulation of said user data region and said error correction/detection by using second phase synchronization means for carrying out bit synchronization in said second bit sync region, and second symbol synchronization means for carrying out symbol synchronization in said second symbol sync region.

3. A data demodulating apparatus according to claim 2, wherein when said first bit sync region or at least a part of said first symbol sync region is defected, said second data demodulating means is activated by using said second bit sync region or data of said second symbol sync region.

4. A data demodulating apparatus, wherein a data sector for stores a part of user data or the whole of the user data, and said data sector at least comprises a bit sync region for carrying out bit synchronization, a symbol sync region for carrying out symbol synchronization, a coded user data region for recording a part of said user data or the whole of the data by coding, and an error correction detection region for error correction and error detection of the recorded data, said data demodulating apparatus comprising:
   phase synchronizing means for carrying out bit synchronization in said bit sync region;
   symbol synchronizing means for carrying out symbol synchronization in said symbol synch region; and
   storage means for storing a part of said bit synch region, or the whole of the region, a part of said symbol sync region, or the whole region, and data of the coded user data region, and data of said error correction detection region,
   wherein data of said bit sync region, said symbol sync region, said coded user data region and said error correction detection region output in accordance with a first sequence is stored in said memory means, and
   wherein in accordance with a second sequence, averaging is carried out between outputted each data and stored each data, and by utilizing the averaged data, demodulation of said user data region, and said error correction/detection is carried out.

* * * * *